United States Patent

Cavanagh et al.

[11] Patent Number: 5,865,857
[45] Date of Patent: *Feb. 2, 1999

[54] BLUE TO GREEN DISPERSE DYES FOR SYNTHETIC FIBER MATERIAL

[75] Inventors: Denise Cavanagh, Manchester; Mark Robert James, Rawtenstall; Barry Huston Meyrick; Paul Wight, both of Manchester, all of Great Britain

[73] Assignee: Zeneca Limited, London, England

[*] Notice: The term of this patent shall not extend beyond the expiration date of Pat. No. 5,660,598.

[21] Appl. No.: 878,845

[22] Filed: Jun. 19, 1997

Related U.S. Application Data

[63] Continuation of Ser. No. 432,203, filed as PCT/GB93/02158, Oct. 20, 1993, Pat. No. 5,660,598.

[30] Foreign Application Priority Data

| Nov. 5, 1992 | [GB] | United Kingdom | 9223208 |
| Jan. 25, 1993 | [GB] | United Kingdom | 9301374 |
| Jun. 14, 1993 | [GB] | United Kingdom | 9312203 |
| Jun. 14, 1993 | [GB] | United Kingdom | 9312206 |

[51] Int. Cl.$^6$ .......................... C09B 23/00; C09B 67/22; D06P 1/16; D06P 3/852
[52] U.S. Cl. .......................... 8/532; 8/533; 8/921; 8/922; 8/924; 8/926; 8/638; 544/353; 548/466; 548/550; 546/208
[58] Field of Search ............................ 8/638, 532, 533, 8/922, 926; 544/353; 546/208; 548/466, 550

[56] References Cited

U.S. PATENT DOCUMENTS

| 3,013,013 | 12/1961 | Carboni | 260/240 |
| 4,845,235 | 7/1989 | Matumoto . | |

FOREIGN PATENT DOCUMENTS

| 0 327 077 A1 | 8/1989 | European Pat. Off. | B41M 5/26 |
| 0 511 525 A1 | 11/1992 | European Pat. Off. | B41M 5/38 |
| 2 191 498 | 12/1987 | United Kingdom | C09B 23/00 |

Primary Examiner—Margaret Einsmann
Attorney, Agent, or Firm—Pillsbury Madison & Sutro LLP

[57] ABSTRACT

A dye of Formula (1):

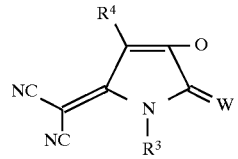

Formula (1)

wherein:
D is a group of Formula (2):

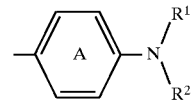

Formula (2)

or a group of Formula (3):

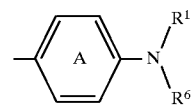

Formula (3)

or a group of Formula (4):

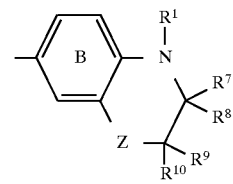

Formula (4)

The variables are defined in the disclosures.

The dyes and dye mixtures produce blue to green shades on synthetic textile materials such as polyester which have good build up and good light- and wet-fastness.

12 Claims, No Drawings

BLUE TO GREEN DISPERSE DYES FOR SYNTHETIC FIBER MATERIAL

This is a continuation of application Ser. No. 08/432,203, filed May 3, 1995, now U.S. Pat. No. 5,660,598, a 371 national phase filing based on PCT/GB93/02158, filed Oct. 20, 1993.

This invention relates to dyes particularly 4-cyano-5-dicyanomethylidene derivatives, mixtures thereof, mixtures with other dyes types, their use to colour textile materials and to a process for the manufacture of dyes.

Various types of disperse dyes, such as anthraquinone and azo dyes, have been used to dye synthetic textile materials blue to green shades but few of these have fully satisfactory properties and either do not build up well on the material, have poor temperature range properties or have inadequate light or wet fastness or are dyebath unstable or dull in shade.

The market leading dye in this shade area is an anthraquinone dye, C.I. Disperse Blue 60, its build up, heat fastness properties, on synthetic textile material, and its dyebath stability are relatively poor and it is tinctorially weak and thus relatively expensive to use.

GB 2191498 discloses certain symmetrical N,N-di-$C_{1-6}$-alkyl or substituted N-alkyl pyrroline dyes which are generally poor dyes which do not build up well on synthetic textile materials.

According to the present invention there is provided a dye of Formula (1):

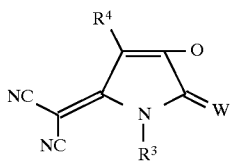

Formula (1)

wherein:

D is a group of Formula (2):

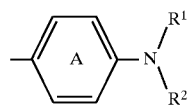

Formula (2)

or a group of Formula (3):

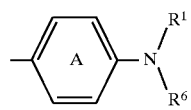

Formula (3)

or a group of Formula (4):

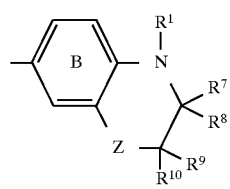

Formula (4)

$R^1$ is alkyl, cycloalkyl, aryl, alkenyl or aralkyl each of which may be optionally substituted;

$R^2$ is optionally substituted $C_{7-20}$-alkyl; or $R^1$ and $R^2$ together with the nitrogen atom to which they are attached form a pyrrolidino or piperidino ring;

$R^3$ is —H or alkyl, alkenyl or aralkyl each of which may be optionally substituted, —$SO_2$alkyl, —$SO_2$aryl or —COR in which R is —H or alkyl, phenyl, cycloalkyl or aralkyl each of which may be optionally substituted; and $R^4$ is an electron withdrawing group;

$R^6$ is optionally substituted $C_{1-6}$-alkyl; or $R^1$ and $R^6$ together with the nitrogen atom to which they are attached form a pyrrolidino or piperidino ring;

$R^7$, $R^8$, $R^9$ and $R^{10}$ each independently is —H or alkyl, cycloalkyl, aryl, alkenyl or aralkyl each of which may be optionally substituted;

W is oxygen or sulphur;

Z is a direct link or N—$R^{11}$ in which $R^{11}$ is —H or optionally substituted alkyl, or aryl;

Ring A is unsubstituted apart from the —$NR^1R^2$ group or is substituted by from 1 to 4 further groups;

Ring B is unsubstituted or substituted by from 1 to 3 groups; except for 3-(4-(N,N-di-n-octylamino)phenyl)-4-cyano-5-dicyano methylidene-2-oxo-2,5-dihydropyrrole provided that:

(a) when D is a group of Formula (2) and $R^1$ and $R^2$ are both allyl that $R^4$ is not —CN; and (b) when D is a group of Formula (3) that $R^1$ and $R^6$ are different and $R^1$ is not —$C_2H_5$, —$C_3H_7$ or —$C_4H_9$ when $R^6$ is -$C_2H_4$phenyl, —$C_3H_6$phenyl and ethyl substituted by —OH, —CN, —$OCH_3$, —$OC_2H_4OC_2H_5$, —$NHCOCH_3$, —Ophenyl and —$NHSO_2CH_3$; or (c) that at least one of $R^1$ and $R^6$ is branched chain alkyl.

The dyes of the present invention and mixtures described herein generally do not suffer from the problems of known dyes and build up well on synthetic textile materials.

The optionally substituted alkyl group represented by $R^1$ is preferably a $C_{1-20}$-alkyl, more preferably a $C_{1-12}$-alkyl and especially a $C_{1-8}$-alkyl group. The optionally substituted cycloalkyl group represented by R, $R^1$, $R^7$, $R^8$, $R^9$, $R^{10}$ and $R^{11}$ is preferably a $C_{4-8}$-cycloalkyl and more preferably a cyclohexyl group. The optionally substituted aryl group represented by $R^1$, $R^7$, $R^8$, $R^9$ and $R^{10}$ is preferably phenyl. The optionally substituted alkenyl group represented by $R^1$, $R^3$, $R^7$, $R^8$, $R^9$ and $R^{10}$ is preferably a $C_{2-10}$-alkenyl, more preferably a $C_{2-6}$-alkenyl and especially a $C_{2-3}$-alkenyl group, such as allyl. The optionally substituted aralkyl group represented by R, $R^1$, $R^3$, $R^7$, $R^8$, $R^9$ and $R^{10}$ is preferably a phenyl $C_{1-6}$-alkyl, more preferably a phenyl $C_{1-3}$-alkyl, especially benzyl, phenylethyl, chlorobenzyl or nitrobenzyl.

The optionally substituted alkyl group represented by $R^2$ is preferably a $C_{7-15}$-alkyl, more preferably a $C_{7-12}$-alkyl and especially a $C_{7-9}$-alkyl group.

Where $R^3$ is —$SO_2$alkyl it is preferably —$SO_2C_{1-4}$-alkyl and where $R^3$ is —$SO_2$aryl it is preferably —$SO_2$phenyl or —$SO_2$(methyl)phenyl.

The optionally substituted alkyl group represented by $R^3$ is preferably a $C_{1-6}$-alkyl and more preferably a $C_{1-4}$-alkyl group.

The optionally substituted alkyl group represented by R, $R^7$, $R^8$, $R^9$ and $R^{10}$ is preferably $C_{1-20}$-alkyl, more preferably $C_{1-10}$-alkyl and especially $C_{1-8}$-alkyl.

$R^3$ is preferably —H, $C_{1-4}$-alkyl, $C_{2-3}$-alkenyl or phenyl $C_{1-3}$-alkyl, more preferably —H or C1-4-alkyl and especially —H.

W is preferably oxygen.

D is preferably a group of Formula (2).

Where any of the groups R, $R^1$, $R^2$, $R^3$, $R^6$, $R^7$, $R^8$, $R^9$, $R^{10}$ and $R^{11}$ are optionally substituted the substituents are preferably selected from nitro, cyano, hydroxy, halogen such as —F, —Cl and —Br, phenyl, $C_{4-8}$-cycloalkyl, alkyl, alkoxy, alkoxyalkoxy, alkylcarbonyl, alkoxycarbonyl, alkylalkoxycarbonyl, alkoxyalkoxycarbonyl, alkylcarbonyloxy, phenoxyalkyl, alkoxycarbonyloxy, alkoxyalkoxycarbonyloxy, alkylcarbonyloxy, phenoxyalkoxycarbonyl, —NR$_2$, —COR and —CO$_2$R in which R is as hereinbefore defined, —NHCOalkyl and —NHSO$_2$alkyl in each of these substituents each alkyl is preferably C$_{1-4}$-alkyl and each alkoxy is preferably C$_{1-4}$-alkoxy.

The alkyl groups represented by R, R$^1$, R$^2$, R$^3$, R$^6$, R$^7$, R$^8$, R$^9$, R$^{10}$ and R$^{11}$ may be straight or branched chain alkyl groups. R$^1$ is preferably C$_{1-12}$-alkyl more preferably C$_{1-8}$-alkyl especially unsubstituted C$_{1-8}$-alkyl. R$^2$ is preferably C$_{7-12}$-alkyl and more preferably C$_{7-9}$-alkyl especially unsubstituted C$_{7-9}$-alkyl. R$^6$ is preferably unsubstituted C$_{1-6}$-alkyl. Where D is a group of Formula (2) it is preferred that one or both of R$^1$ and R$^2$ is branched, more preferably branched at an α- or β-position. It is preferred that R$^1$ and R$^2$ are different. Where D is a group of Formula (2) it is preferred that one or both or R$^1$ and R$^6$ is branched, more preferably branched at an α- or β-position. It is preferred that R$^1$ and R$^6$ are different.

The electron withdrawing group represented by R$^4$ is preferably —CN, —SO$_2$F, —COOR$^5$, —CON(R$^5$)$_2$, —So$_2$R$^5$ in which R$^5$ is —H or any of the groups defined for R$^1$, R$^4$ is especially —CN. R$^5$ is preferably C$_{1-4}$-alkyl.

Where Ring A is substituted by from 1 to 4 further groups or Ring B is substituted from 1 to 3 further groups these substituent groups may be cyanoC$_{1-4}$-alkyl or any of the optional substituents described above for R. Ring A is preferably unsubstituted apart from the —NR$^1$R$^2$ group or is substituted by from 1 to 2 and more preferably 1 further group(s). Ring B is preferably unsubstituted.

In dyes of Formula (1) in which D is of Formula (4) and Z is a direct link or N—R$^{11}$ it is preferred that at least one of R$^7$ and R$^8$ is alkyl and R$^1$ is branched alkyl or that both R$^7$ and R$^8$ independently is alkyl. Such dyes have improved light fastness properties.

In dyes of Formula (1) in which D is a group of Formula (4) and where Z is a direct link a five membered ring of Formula (4C) is formed.

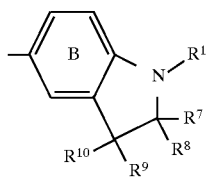

Formula (4C)

dyes of this type in which R$^3$, R$^4$, R$^7$, R$^8$, R$^9$, R$^{10}$, W and Ring A are as hereinbefore defined are a preferred sub-group of the present invention.

A preferred sub-group of dyes of Formula (1) is that in which D is a group of Formula (2);
R$^1$ is optionally substituted alkyl;
R$^2$ is optionally substituted C$_{7-20}$-alkyl;
R$^3$ is alkyl or —H;
R$^4$ is —CN;
Ring A is unsubstituted apart from the NR$^1$R$^2$ group; and
W is oxygen.

A further preferred sub-group of dyes of Formula (1) is that in which D is a group of Formula (3);
R$^1$ is unsubstituted C$_{1-8}$-alkyl;
R$^6$ is unsubstituted C$_{1-6}$-alkyl;
R$^3$ is —H or alkyl;
R$^4$ is —CN;

Ring A is unsubstituted apart from the —NR$^1$R$^2$ group; and
W is oxygen;
and R$^1$ and R$^6$ are different or at least one of R$^1$ and R$^6$ is branched chain alkyl.

A further preferred sub-group of dyes of Formula (1) is that in which D is a group of Formula (4);
R$^1$ is C$_{1-8}$-alkyl;
R$^3$ is —H or C$_{1-4}$-alkyl;
R$^4$ is —CN;
R$^7$, R$^8$, R$^9$ and R$^{10}$ each independently is —H or alkyl;
Z is a direct link;
W is oxygen;
Ring B is unsubstituted where at least one of R$^7$ and R$^8$ is alkyl and R$^1$ is branched alkyl or that both R$^7$ and R$^8$ independently is alkyl.

An especially preferred sub-group of dyes of Formula (1) is that in which D is a group of Formula (2):
R$^1$ is unsubstituted C$_{1-8}$-alkyl;
R$^2$ is unsubstituted C$_{7-9}$-alkyl;
R$^3$ is —H;
R$^4$ is —CN;
Ring A is unsubstituted apart from the —NR$^1$R$^2$ group; and
W is oxygen.

A further especially preferred sub-group of dyes of Formula (1) is that in which D is a group of Formula (2);
R$^1$ is n-propyl or n-butyl;
R$^2$ is 1-methylhexyl or 2-ethylhexyl;
R$^3$ is —H;
R$^4$ is —CN;
Ring A is unsubstituted apart from the —NR$^1$R$^2$ group; and
W is oxygen.

When R$^3$ is H dyes of Formula (1) may exist in a tautomeric form represented by Formula (1A):

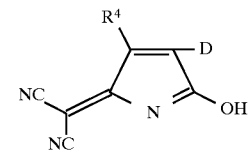

Formula (1A)

wherein:
R$^4$ and D are as hereinbefore defined.

The dyes of Formula (1) where D is a group of Formula (2) or (3) may be prepared by reaction of an aniline of Formula (5):

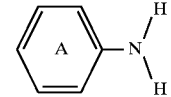

Formula (5)

in which Ring A is as hereinbefore defined firstly with a compound of Formula R$^1$X in which R$^1$ is as hereinbefore defined and X is a halogen such as —Cl, —Br or —I or other leaving group such as tosylates, mesylates and alkylsulphonates in the presence of a base such as an alkali metal carbonate or alkaline earth metal carbonate such as K$_2$CO$_3$ or CaCO$_3$ and secondly with a compound of formula, R$^2$X or R$^6$X in which R$^2$, R$^6$ and X are as hereinbefore defined in the presence of a base as above to form an aromatic amine of Formula (2) or (3A):

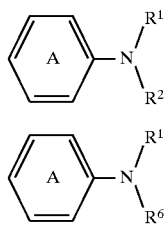

Formula (2A)

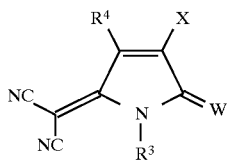

Formula (7)

Formula (3A)

in which $R^3$, $R^4$ and W are as hereinbefore defined and X is preferably a halogen such as —Cl or —Br to form a compound of Formula (1). The reaction may be performed in a liquid medium such as N,N-dimethylformamide, N,N-dimethylacetamide, dimethylsulphoxide, sulpholane, N-methylpyrrolidone, acetonitrile, toluene or tetrahydrofuran or any mixture thereof and at a temperature from $-20°$ C. to $50°$ C. The product may be isolated by any convenient means such as pouring the reaction mixture into a mixture of ice and water and recovering the precipitated product by filtration. The product may be purified by any convenient means such as trituration or recrystallisation from organic liquids particularly alkanols such as methanol, ethanol and esters such as ethylacetate or mixtures thereof.

Alternatively the aromatic amines of Formula (2A) and (3A) may be prepared by reductive alkylation of the aniline of Formula (5) with an appropriate ketone or aldehyde. The reductive alkylation may be performed in an inert liquid medium such as an alcohol or ester optionally in the presence of an acid such as an an aliphatic carboxylic acid such as acetic and propionic acids or aromatic sulphonic acid e.g. 4-toluenesulphonic acid using a metal or supported metal catalyst such as palladium or platinum on carbon and hydrogen, optionally at elevated temperature and pressure. Alternatively reducing agents such as sodium borohydride may be used. After the reductive alkylation a second alkyl group may be introduced as described above.

The dyes of Formula (1) where D is a group of Formula (4) may be prepared by reacting an indoline or piperazine of Formula (6):

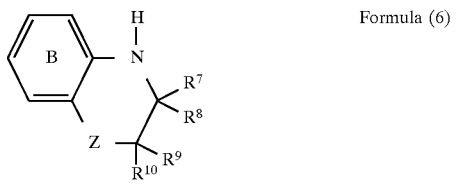

Formula (6)

The 3-halo-2-oxopyrrole of Formula (7) may be prepared by alogenation of a compound which may be represented by Formulae (8) or (8A):

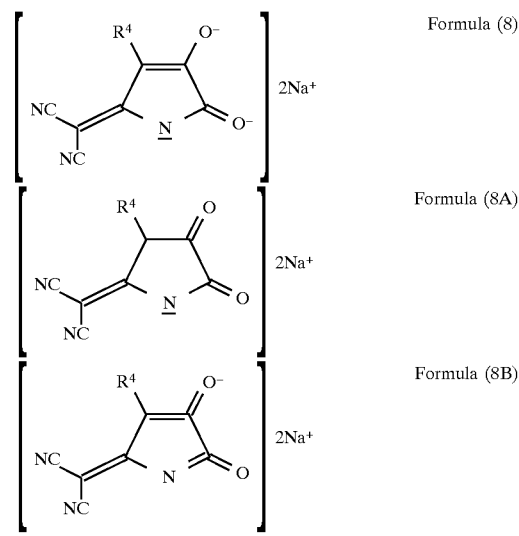

in which $R^7$ to $R^{10}$, Z and Ring B are as hereinbefore defined with a compound of Formula $R^1X$ in which $R^1$ and X are as hereinbefore defined in the presence of a base as above to form a compound of Formula (4A):

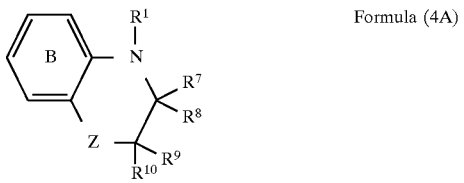

Formula (4A)

The dyes of Formula (1) where D is a group of Formula (4) and Z is a direct link may also be prepared by reaction of an aniline of Formula (5A):

Formula (5A)

in which Ring B is as hereinbefore defined with a compound of Formula $R^1X$ as described above followed by reaction with a haloalkene (such as 3-chloro-2-methylpropene) in the presence of a base such as NaH or $K_2CO_3$ in a liquid medium such as dimethylformamide or tetrahydrofuran to form an N-alkyleneaminobenzene followed by ring closure by heating at approximately $140°$ C. in a liquid medium such as xylene in the presence of a Lewis acid such as $ZnCl_2$ or a protic acid such as $H_3PO_4$ or $H_2SO_4$ to form a compound of Formula (4A) in which Z is a direct link and at least one of $R^7$, $R^8$, $R^9$ or $R^{10}$ is other than —H. One of the compounds of Formulae (2A), (3A) or (4A) is then reacted with a 3-halopyrrole of Formula (7):

with a halogenating agent such as phosphorus oxychloride, phosphorus trichloride, phosphorus pentachloride, thionyl chloride or phosgene at a temperature of from $-20°$ C. to $50°$ C. in a liquid medium such as N,N-dimethylformamide, N,N-diethylacetamide, dimethylsulphoxide, sulpholane, N-methylpyrrolidone, acetonitrile or tetrahydrofuran. The product may be used without isolation with improvement in yield in the preparation of compounds of Formula (1) described above or may be isolated by evaporating the liquid medium.

Alternatively the compounds of Formulae (2A), (3A) or (4A) may be reacted directly with the compound represented by Formulae (8), (8A) and (8B) in a liquid medium such as toluene in the presence of a halogenating agent such as phosphorus oxychloride.

The compounds represented by Formulae (8) or (8A) may be prepared by reaction of diethyloxalate with a compound of Formula (9):

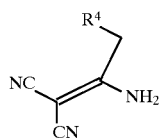

Formula (9)

in which $R^4$ is as hereinbefore defined in the presence of a base such as an alkali metal alkoxide preferably a sodium or a potassium $C_{1-6}$-alkoxide and especially sodium or potassium methoxide, ethoxide, n- or iso-propoxide, n-, iso- or tertiary-butoxide in a liquid medium preferably an alkanol such as methanol, ethanol, n- or iso-propanol, n-, iso- or tertiary-butanol at a temperature of from 10° C. to 60° C. The product may be isolated by cooling the reaction mixture and collection by filtration.

The compound of Formula (9) may be prepared by reaction of malononitrile with a compound of Formula (10):

NCCH$_2$R$^4$  Formula (10)

in which $R^4$ is as hereinbefore defined in the presence of a base such as sodium methoxide in a liquid medium such as methanol at a temperature of from −20° C. to 60° C. The product may be isolated by filtration.

Dyes of Formula (1) and Formula (11) in which $R^3$ and $R^{13}$ are other than —H may be prepared by reaction of the corresponding dyes of Formula (1) or Formula (11) in which $R^3$ and $R^{13}$ are —H in a liquid medium, preferably in an amide such as dimethylformamide or an ether such as tetrahydrofuran or diethylether in the presence of a base, preferably an alkali metal carbonate such as potassium carbonate or an alkali metal hydride such as sodium hydride at a temperature of from 0° C. to 120° C. with an appropriate alkylating or acylating agent. Where $R^3$ is alkyl an appropriate alkylating agent is an alkyl halide, preferably an alkyl iodide, bromide or chloride. Where $R^3$ is alkenyl an appropriate alkylating agent is an alkenyl halide, preferably an alkenyl bromide. Where $R^3$ is aralkyl an appropriate alkylating agent is an aralkyl halide preferably an aralkyl bromide. Where $R^3$ is —COR and R is alkyl, phenyl or cycloalkyl appropriate acylating agents are acid chlorides or acid anhydrides. These dyes may be isolated by evaporating the liquid medium or by filtration from the reaction mixture.

According to a further feature of the present invention there is provided a mixture of two or more dyes of Formula (1) wherein R, $R^1$ to $R^{10}$ inclusive, D, W, Ring A and Ring B are as hereinbefore defined.

According to a further feature of the present invention there is provided a mixture of one or more dyes of Formula (1) and one or more dyes of Formula (11):

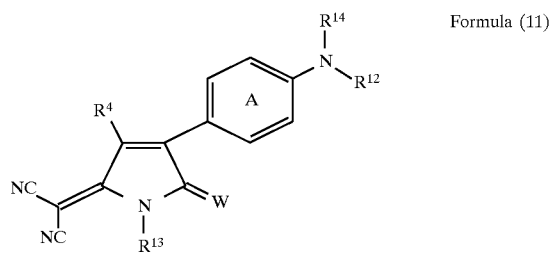

Formula (11)

wherein:

R, $R^1$ to $R^{10}$ inclusive, D, W, Ring A and Ring B are as hereinbefore defined;

$R^{12}$ and $R^{14}$ are each independently alkyl, alkenyl, alkoxyalkyl, alkenyloxyalkyl, aryloxyalkyl, aralkyl, alkoxycarbonylalkyl or aryloxyalkoxycarbonylalkyl; and $R^{13}$ is —H, alkyl, alkenyl, aralkyl, alkoxycarbonylalkyl, aryloxyalkoxycarbonylalkyl or cyanoalkyl.

According to a further feature of the present invention there is provided a mixture of two or more dyes of Formula (11) wherein $R^4$, $R^{12}{}_1$ $R^{13}$ and $R^{14}$ and Ring A are as hereinbefore defined.

Where $R^{12}$, $R^{13}$ or $R^{14}$ is alkyl it is preferably a $C_{1-10}$alkyl and more preferably a $C_{1-6}$-alkyl group. Where $R^{12}$, $R^{13}$ or $R^{14}$ is alkenyl it is preferably $C_{2-6}$-alkenyl, more preferably $C_{2-3}$-alkenyl and especially allyl. Where $R^{12}$ or $R^{14}$ is alkoxyalkyl it is preferably $C_{1-6}$-alkoxy$C_{1-6}$-alkyl, more preferably $C_{1-6}$-alkoxy$C_{1-4}$-alkyl and especially $C_{1-6}$-alkoxyethyl. Where $R^{12}$ or R14 is alkenyloxyalkyl it is preferably $C_{2-6}$-alkenyloxy$C_{1-6}$-alkyl, more preferably $C_{2-4}$-alkenyloxy$C_{1-4}$-alkyl and especially allyloxyethyl. Where $R^{12}$ or $R^{14}$ is aryloxyalkyl it is preferably phenoxy$C_{1-6}$-alkyl, more preferably phenoxy$C_{1-4}$-alkyl and especially phenoxyethyl. Where $R^{12}$, $R^{13}$ or $R^{14}$ is aralkyl it is preferably phenyl$C_{1-6}$-alkyl and more preferably phenyl C1-3-alkyl and especially benzyl, chlorobenzyl, nitrobenzyl and phenylethyl. Where $R^{12}$, $R^{13}$ or $R^{14}$ is alkoxycarbonylalkyl it is preferably $C_{1-6}$-alkoxycarbonylC-$_{1-6}$-alkyl and more preferably $C_{1-6}$-alkoxycarbonyl$C_{1-3}$-alkyl. Where $R^{12}$, $R^{13}$ or $R^{14}$ is aryloxyalkoxycarbonylalkyl it is preferably phenoxy$C_{1-6}$-alkoxycarbonyl $C_{1-6}$-alkyl, more preferably phenoxy$C_{1-4}$-alkoxycarbonyl$C_{1-4}$-alkyl and especially phenoxyethoxycarbonyl$C_{2-3}$-alkyl. Where $R^{13}$ is cyanoalkyl it is preferably cyano$C_{1-6}$-alkyl, more preferably cyano$C_{1-4}$-alkyl and especially cyano$C_{1-2}$-alkyl. The compounds of Formula (11) may be prepared in an analogous manner to that described above for compounds of Formula (1).

Mixtures of two or more different dyes of Formula (1) or of one or more dyes of Formula (1) and one or more dyes of Formula (11) generally show an improvement in dyeing properties such as build up on synthetic textile materials when compared with the performance of the individual dyes.

The dyes may be mixed in a ratio of from 2.5 to 97.5% of one dye of Formula (1) with from 97.5 to 2.5% of a different dye of Formula (1) or a dye of Formula (11). Mixtures of different dyes of Formula (1) preferably comprise from 2.5 to 50%, more preferably from 2.5 to 30% and especially from 2.5 to 20% of one dye of Formula (1) with from 97.5 to 50%, 97.5 to 70% and 97.5 to 80% respectively of a different dye of Formula (1).

Mixtures of dyes of Formula (1) and Formula (11) preferably comprise from 2.5 to 50%, more preferably from 2.5 to 30% and especially from 2.5 to 20% of a dye of Formula (11) and from 97.5 to 50%, 97.5 to 70% and 97.5 to 80% respectively of a dye of Formula (1).

Preferred mixtures of dyes comprise dyes from the preferred and especially preferred sub-groups mentioned above.

$R^{13}$ is preferably —H or alkyl more preferably —H. $R^{12}$ is preferably $C_{1-8}$-alkyl. $R^{14}$ is preferably $C_{1-8}$-alkyl or phenyl $C_{1-3}$-alkyl.

A further preferred mixture of dyes comprises a dye of Formula (1) in which D is a group of Formula (2), W is oxygen, $R^4$ is —CN, $R^3$ is —H, Ring A is unsubstituted, $R^1$ is n-butyl or n-propyl and $R^2$ is 1-methylhexyl or 2-ethylhexyl and a dye of Formula (11) in which $R^4$ is —CN, $R^{13}$ is —H, $R^{12}$ is n—$C_3H_7$, n—$C_4H_9$ or n—$C_5H_{11}$. $R^{14}$ is —(CH$_2$)$_3$phenyl, n—$C_3H_7$, n—$C_4H_9$ or n—$C_5H_{11}$ and Ring A is unsubstituted.

A further preferred mixture of dyes comprises two or more dyes of Formula (11) in which $R^4$ is —CN, $R^{13}$ is —H, $R^{12}$ is n—$C_3H_7$, n—$C_4H_9$ or n—$C_5H_{11}$ and $R^{14}$ is —(CH$_2$)$_3$phenyl, n—$C_3H_7$, n—$C_4H_9$ or n—$C_5H_{11}$.

A further preferred mixture of dyes comprises a dye of Formula (1) in which D is a group of Formula (2), W is oxygen, $R^4$ is —CN, $R^3$ is —H, Ring A is unsubstituted, $R^1$ is n-butyl or n-propyl and $R^2$ is 1-methylhexyl or 2-ethylhexyl and a dye of Formula (1) in which D is a group of Formula (2), W is oxygen, $R^4$ is —CN, $R^3$ is —H, Ring A is unsubstituted, $R^1$ is n-pentyl, n-hexyl, n-heptyl or n-octyl and $R^2$ is 1-ethylhexyl or 2-ethylhexyl.

Especially preferred mixture of dyes comprise 3-(4-(N-ethyl-N-2-ethylhexylamino)phenyl)-4-cyano-5-dicyanomethylidene-2-oxo-2,5-dihydropyrrole and 3-(4-(N-n-butyl-N-2-ethylhexylamino)phenyl)-4-cyano-4-dicyanomethylidene-2-oxo-2,5-dihydropyrrole; 3-(4-(N-n-propyl-N-2-ethylhexylamino)phenyl)-4-cyano-5-dicyanomethylidene-2-oxo-2,5-dihydropyrrole and 3-(4-(N,N-di-n-propylamino)phenyl)-4-cyano-5-dicyanomethylidene-2-oxo-2,5-dihydropyrrole; and 3-(4-(N-butyl)-N-(1-methylhexyl)amino)phenyl)-4-cyano-5-dicyanomethylidene-2-oxo-2,5-dihydropyrrole and 3-(4-(N,N-di-n-butylamino)phenyl)-4-cyano-5-dicyanomethylidene-2-oxo-2,5-dihydropyrrole.

In addition the dyes of the present invention may be mixed with other classes of disperse dyes such as monoazo, disazo, trisazo, anthraquinone, benzodifuranone, methines, quinphthalone, nitro dyes, flavones, dioxopyrrole, squarilium, coumarin, naphthalimide, naphtholactam, triphendioxazine, indoaniline, indophenol and hydrazone particularly with yellow dyes such as monoazo, methines, quinphthalone, nitro dyes, flavones and hydrazones to produce green shades.

The mixtures of dyes may be prepared simply by mixing the separate dyes together or may be prepared by co-synthesis or co-crystallisation. The co-synthesis may be carried by reacting a compound of Formula (3) in which one of $R^1$ or $R^2$ is H, and the other $R^1$ or $R^2$ is as hereinbefore defined, with two or more different alkyl halides.

The dyes of the present invention may be used for the coloration of textile materials particularly synthetic textile materials especially polyester such as polyethylene terephthalate, polyamide such as polyhexamethylene adipamide, polyurethane elastomers, cellulose acetate and triacetate. The dyes are also useful for colouring blends of fibres containing one or more synthetic textile materials together with other types of fibre such as polyester-cotton, polyester-wool and polyester-viscose blends. These uses form further features of the present invention. The textile materials may be in the form of filaments, loose fibres, yarn or may be in the form of woven or knitted fabrics. The present dyes, optionally in conjunction with other disperse dyes may be applied to the synthetic textile materials by methods employed in applying disperse dyes to such material for example by exhaust dyeing, continuous dyeing, printing and discharge printing processes using the conditions and additives conventionally used in carrying out such processes. The present dyes are generally dyebath stable and produce blue to green shades on polyester which have good build-up, temperature range and good light- and wet-fastness.

The invention is further illustrated by the following examples in which all parts and percentages are by weight. Where NMR analyses are provided in the following examples m=multiplet, s=singlet, d=doublet, tr=triplet, bs=broadsinglet, q=quartet.

EXAMPLE 1

Preparation of 3-(4-(N-butyl-N-2-ethylhexylamino) phenyl)-4-cyano-5-dicyanomethylidene-2-oxo-2,5-dihydropyrrole i) Preparation of the disodium salt of 4-cyano-5-dicyanomethylidene-3-hydroxy-2-oxo-2,5-dihydropyrrole sodium metal (6.9 parts) was added to absolute ethanol (130 parts) in small portions over about 1 hour allowing the temperature to rise to approximately 60° C. The solution of sodium ethoxide thus formed was cooled to 30° C. and diethyloxalate (22.5 parts) was added over about 10 minutes whilst maintaining the temperature at 30° C. to 35° C. Malononitrile dimer (19.7 parts, ex Lonza Chemicals) was added over about 15 minutes whilst maintaining the temperature at 35° C. to 40° C.

The reaction mixture was heated to 60° C. for 30 minutes before cooling to ambient temperature. The precipitated product was collected by filtration, washed with ethanol and dried at 50° C. to give the disodium salt of 4-cyano-5-dicyanomethylidene-3-hydroxy-2-oxo-2,5-dihydropyrrole (33 parts, 96%).

ii) The disodium salt of 4-cyano-5-dicyanomethylidene-3-hydroxy-2-oxo-2,5-dihydropyrrole (3.5 parts) was stirred in dry N,N-dimethylformamide (20 parts) and cooled to 0° C. to 5° C. before adding dropwise phosphorus oxychloride (6.9 parts) maintaining the temperature at 0° C. to 5° C. The reaction mixture was stirred for 3 hours before adding dropwise a solution of N-butyl-N-2-ethylhexylaniline (7.8 parts) in dry N,N-dimethylformamide (10 parts) and pyridine (3 parts) maintaining the temperature at 0° C. to 5° C. for 24 hours. The reaction mixture was poured into a mixture of ice and water (200 parts) and stirred at a temperature of 0° C. to 5° C. for 2 hours before filtering off a solid. The solid was slurried with methanol and filtered before dissolving in acetone and precipitating by the addition of water and collecting the solid by filtration. The solid was slurried in hot methanol and collected by filtration before drying at 50° C. to yield 3-(4-(N-butyl-N-2-ethylhexyl amino)phenyl)-4-cyano-5-dicyanomethylidene-2-oxo-2,5-dihydropyrrole (1.3 parts, 20%) m.p. 195° C., $\lambda$max ($CH_2Cl_2$) 660 nm.

EXAMPLE 2

Preparation of 3-(4-(N-butol-N-(1-methylhexyl) amino)phenyl)-4-cyano-5-dicyanomethylidene-2-oxo-2,5-dihydropyrrole i) A mixture of aniline (100 parts), 2-heptanone (220 parts), 4-toluene sulphonic acid (6 parts) and 3% palladium on carbon (5 parts) in a 1 litre autoclave was charged with hydrogen to a pressure of 80 atmospheres and heated at 150° C. for 40 hours. The cooled reaction mixture was diluted with ethyl acetate, filtered, washed with 1N-hydrochloric acid (6×200 parts) and water (2×200 parts), the ethyl acetate was separated and dried ($MgSO_4$) before evaporating to leave N-(1-methylhexyl)aniline (76 parts, 37%).

ia) Alternatively, N-(1-methylhexyl)aniline can be prepared as follows: To an ice cooled, stirred mixture of aniline (28 parts), heptan-2-one (69 parts) and propionic acid (9parts) was added sodium borohydride (9.8 parts) portionwise at such a rate as to keep the temperature less than 5° C. The reaction mixture was allowed to warm up to room temperature and stirred overnight. The reaction mixture was poured into an ice water mixture, extracted with ethyl acetate, the organic phase washed with water, 2% hydrochloric acid and water. The dried organic phase was evaporated to leave N-(1-methylhexyl)aniline (53.5 parts, 93%).

ii) A mixture of N-(1-methylhexyl)aniline (76 parts), 1-bromobutane (66 parts), anhydrous potassium carbonate (65 parts) and DMF (150 parts) was stirred while heating under reflux for 41 hours. An additional quantity of 1-bromobutane (44 parts) was added and the mixture stirred while heating under reflux for a further 19 hours. The cooled mixture was poured into water (400 parts) and the organic phase separated. The aqueous phase was extracted with toluene, the organic phases and toluene extract were combined and washed with water (2×100 parts) before evaporating to leave N-butyl-N-(1-methylhexyl)aniline (72.8 parts, 44%) which was purified by vacuum distillation to give N-butyl-N-(1-methylhexyl)aniline b.pt 73°–80° C., 2.6 mm Hg.

iia) Alternatively N-butyl-N-(1-methylhexyl)aniline may be prepared as follows:

A mixture of N-butylaniline (7.45 parts) anhydrous potassium carbonate (7.5 parts), 2-bromoheptane (13.5 parts) and DMF (25 parts) was stirred at 130° C. for 86 hours. The reaction mixture was poured into water, saturated with salt and extracted with ethyl acetate. The organic phase was washed with water, dried ($MgSO_4$) and evaporated to leave N-butyl-N-(1-methylhexyl)aniline (11.8 parts, approximately 60% strength). This material had acetic anhydride (10 parts) added to it prior to further use.

iii) A stirred mixture of the disodium salt of 4-cyano-5-dicyanomethylidene-3-hydroxy-2-oxo-2,5-dihydropyrrole (23 parts). and dry N,N-dimethylformamide (180 parts) was cooled to −5° C. to −10° C. and N-n-butyl-N-(1-methylhexyl)aniline containing acetic anhydride (27%, 37 parts) was added followed by the dropwise addition of phosphorus oxychloride (26 parts) whilst maintaining the temperature at less than −5° C. The mixture was allowed to warm to room temperature and stirred for 20 hours. The reaction mixture was poured into a stirred mixture of ice and water (400 parts) and acetone (400 parts) was added before filtering off a solid. The solid was washed repeatedly with warm water (40° C.) and then dried at 50° C. to yield 3-(4-(N-butyl-N-(1-methylhexyl)amino)phenyl)-4-cyano-5-dicyanomethylidene-2-oxo-2,5-dihydropyrrole (26.8 parts, 65%). A small sample this material was slurried in boiling methanol, collected by filtration, washed with methanol and dried at 50° C. to give 3-(4-(N-n-butyl-N-(1-methylhexyl) amino)phenyl)-4-cyano-5-dicyanomethylidene-2-oxo-2,5-dihydropyrrole m.p. 188° C.; $\lambda$max ($CH_2Cl_2$) 662 nm ($\epsilon$max 60231); M/Z (EI) 415 ($M^+$, 20%), 400 (15), 372 (12), 344 (100), 288 (33) and 272 (25).

EXAMPLE 3

Preparation of 3-(4-(N-(2-ethylhexyl)-N-propoylamino)phenyl)-4-cyano-5-dicyanomethylidene-2-oxo-2,5-dihydropyrrole i) A mixture of N-propylaniline (24 parts), 2-ethylhexyl bromide (58 parts), anhydrous potassium carbonate (42 parts) and dry N,N-dimethylformamide (50 parts) was stirred at 125° C. for 16 hours. The cooled reaction mixture was poured into water (250 parts), the organic phase separated and washed with water (2×200 parts) and dried at 90° C. and 15 mmHg to yield N-(2-ethylhexyl)-N-propylaniline (49 parts, 89%). Acetic anhydride was added to this to make a total of 69.5 parts.

ia) Alternatively, N-(2-ethylhexyl)-N-propylaniline may be prepared as follows:

A mixture of aniline (18.6 parts), 2-ethylhexyl bromide (42.4 parts), anhydrous potassium carbonate (30.3 parts) and dry N,N-dimethylformamide (100 parts) was stirred at 75° C. for 24 hours. The cooled mixture was filtered, diluted with dichloromethane and washed with 2N-hydrochloric acid (100 parts). The organic phase was evaported to leave oil which was triturated with petroleum ether and water to give N-(2-ethylhexyl)aniline (18 parts, 43%).

A mixture of N-(2-ethylhexyl)aniline (8.9 parts), 1-bromopropane (7.4 parts), anhydrous potassium carbonate (11 parts) and N,N-dimethylformamide (30 parts) was stirred at 125° C. for 24 hours. An additional quantity of 1-bromopropane (5 parts) was added and the mixture stirred for a further 18 hours at 125° C. The cooled mixture was filtered and poured into water. The product was extracted into dichloromethane and evaporated to yield N-(2-ethylhexyl)-N-propylaniline (8.9 parts, 78%) which was reacted with acetic anhydride prior to use to remove any unreacted starting materials.

ii) A stirred mixture of disodium salt of 4-cyano-5-dicyanomethylidene-3-hydroxy-2-oxo-2,5-dihydropyrrole (29.9 parts) and dry N,N-dimethylformamide (150 parts) was cooled to −10° C. and N-(2-ethylhexyl)-N-propylaniline containing 30% acetic anhydride (63 parts) was added followed by the dropwise addition of phosphorous oxychloride (34 parts) maintaining the temperature at less than −5° C. The mixture was allowed to warm up to room temperature and stirred for 20 hours. The reaction mixture was poured into a stirred mixture of ice and water (200 parts) and acetone (200 parts) and then stirred for 0.5 hours. The solid was filtered off, washed with hot water and dried under vacuum to give 3-(4-(N-(2-ethylhexyl)-N-propylamino) phenyl)-4-cyano-5-dicyanomethylidene-2-oxo-2,5-dihydropyrrole (48.5 parts, 90%).

A small sample of this material was slurried in boiling methanol, collected by filtration, washed with methanol and dried at 60° C. to give 3-(4-(N-(2-ethylhexyl)-N-propylamino)phenyl)-4-cyano-5-dicyano methylidene-2-oxo-2,5-dihydropyrrole m.p. 188.7° C.; $\lambda$max ($CH_2Cl_2$) 659 nm ($\epsilon$max 61612); M/Z (EI) 415 ($M^+$, 15%), 316 (100) and 274 (30).

EXAMPLE 4

Preparation of 3-(4-(N-ethyl-N-2-ethylhexylamino) phenyl)-4-cyano-5-dicyanomethylidene-2-oxo-2,5-dihydropyrrole 3-(4-(N-ethyl-N-2-ethylhexylamino)phenyl)-4-cyano-5-dicyanomethylidene-2-oxo-2,5-dihydropyrrole was prepared from N-ethyl-N-2-ethylhexylaniline using the same method as in Example 3ii).

EXAMPLE 5

Preparation of a Mixture Containing Approximately 75% of 3-(4-(N-ethyl-N-(2-ethylhexyl)amino) phenyl)-4-cyano-5-methylidene-2-oxo-2,5-dihydropyrrole and 25% of 3-(4-(N-butyl-N-(2-ethylhexyl)amino)phenyl)-4-cyano-5-dicyanomethylidene-2-oxo-2,5-dihydropyrrole A mixture of 3-(4-(N-ethyl-N-(2-ethylhexyl)amino) phenyl)-4-cyano-5-dicyanomethylidene-2-oxo-2,5-dihydropyrrole (0.6 parts) and 3-(4-(N-butyl-N-(2-ethylhexyl)amino)phenyl)-4-cyano-5-dicyanomethylidene-2-oxo-2,5-dihydropyrrole (0.2 parts) was dissolved in N,N-dimethylformamide (25 parts) at 50° C. The solution was poured into a mixture of ice and water (100 parts) and acetone (25 parts) and the product collected by filtration. The product was washed with water and dried at 50° C. to give the above mixture (0.76 parts).

EXAMPLE 6

Preparation of 3-(4-N-(2-ethylhexyl)-N-(3-phenylpropyl)amino)phenyl)-4-cyano-5-dicyanomethylidene-2-oxo-2,5-dihydropyrrole i) N-2-(Ethylhexyl)-N-(3-phenylpropyl)aniline was prepared from N-(2-ethylhexyl)aniline (as in Example 3ia)) and 3-phenylpropylbromide (instead of the 1-bromopropane) using the same method as in Example 3ia).

ii) 3-(4-(N-(2-ethylhexyl)-N-(3-phenylpropyl)amino) phenyl)-4-cyano-5-dicyanomethylidene-2-oxo-2,5-dihydropyrrole was prepared from N-(2-ethyl hexyl)-N-(3-phenylpropyl)aniline using the same method as Example 3ii). The material showed the following properties λmax (CH$_2$Cl$_2$) 659 nm (εmax 55428) and δH (250 MH$_z$, CDCl$_3$) 0.8–0.95 (m,6H), 1.20–1.40 (m,8H), 1.7–1.8 (m,1H), 1.9–2.1 (m,2H) 2.65 (t,2H), 3.40 (d,2H), 3.50 (t,2H), 6.65 (d,2H), 7.1–7.45 (m,5H), 8.3 (s,1H) and 8.5 (d,2H)ppm.

EXAMPLE 7

Preparation of 3-(4-(N-n-heptyl-N-(1-methylpropyl)amino) phenyl)-4-cyano-5-dicyanomethylidene-2-oxo-2,5-dihydropyrrole i) N-(1-methylpropyl)aniline was prepared from aniline and 2-bromobutane using the same method as in Example 2ii).
ii) N-n-heptyl-N-(1-methylpropyl)aniline was prepared from N-(1-methylpropyl)aniline and 1-n-heptylbromide using the same method as in Example 2ii).
iii) 3-(4-(N-n-heptyl-N-(1-methylpropyl)amino)phenyl)-4-cyano-5-dicyanomethylidene-2-oxo-2,5-dihydropyrrole was prepared from N-n-heptyl-N-(1-methylpropyl)aniline using the same method as in Example 3ii). The material showed the following properties: λmax (CH$_2$Cl$_2$) 661 nm (εmax 51623); and δH (250 MH$_z$, CDCl$_3$), 0.8–1.0 (m,6H), 1.2–1.45 (m,9H), 1.5–1.75 (m,6H), 3.25–3.35 (m,2H), 4.05–4.15 (m,1H), 6.85 (d,2H), 8.40(s,1H) and 8.55 (d,2H).

EXAMPLE 8

Preparation of 3-(4-(N-(1-ethylpentyl)-N-butylamino)phenyl)-4-cyano-5-dicyanomethylidene-2-oxo-2,5-dihydropyrrole i) N-(1-ethylpentyl)aniline was prepared from aniline and heptan-3-one using the same method as in Example 2i).
ii) N-(1-ethylpentyl)-N-butylaniline was prepared from N-(1-ethyl-pentyl)aniline and bromobutane using the same method as Example 2ii).
iii) 3-(4-(N-(1-ethylpentyl-N-butyl)aminophenyl)-4-cyano-5-dicyanomethylidene-2-oxo-2,5-dihydropyrrole was prepared from N-(1-ethylpentyl)-N-butylaniline using the same method as in Example 2iii). The material showed the following properties: λmax (CH$_2$Cl$_2$) 663 nm (ε67911).

EXAMPLE 9

Preparation of 3-(4-(N-(1-ethyl-3-methylpentyl)-N-propylamino)phenyl)-4-cyano-5-dicyanomethylidene-2-oxo-2,5-dihydropyrrole i) N-(1-Ethyl-3-methylpentyl)aniline was prepared from aniline and 5-methylheptan-3-one using the same method as in Example 2i).
ii) N-(1-Ethyl-3-methylpentyl)-N-propylaniline was prepared from N-(1-ethyl-3-methylpentyl)aniline and 1-bromopropane using the same method as in Example 2ii).
iii) 3-(4-(N-(1-Ethyl-3-methylpentyl)-N-propylamino) phenyl)-4-cyano-5-dicyanomethylidene-2-oxo-2,5-dihydropyrrole was prepared from N-(1-ethyl-3-methylpentyl)-N-propylaniline using the same method as in Example 2iii). The material showed the following properties: λmax (CH$_2$Cl$_2$) 662 nm and M/Z (EI) 415 (M$^+$, 18%), 386 (100) and 344 (97).

EXAMPLE 10

Preparation of 3-(4-N-ethyl-(N-(1-methylhexyl) amino)phenyl)-4-cyano-5-dicyanomethylidene-2-oxo-2,5-dihydropyrrole i) N-Ethyl-N-(1-methylhexyl)aniline was prepared from N-ethylaniline and 2-bromoheptane using the same method as in Example 3i).
ii) 3-(4-(N-Ethyl-N-(1-methylhexyl)amino)phenyl)-4-cyano-5-dicyanomethylidene-2-oxo-2,5-dihydropyrrole was prepared from N-ethyl-N-(1-methylhexyl)aniline using the same method as in Example 2iii). The material showed the following properties: λmax (CH$_2$Cl$_2$) 660 nm and δH (250 MH$_z$, d$_6$DMSO) 0.80 (t,3H), 1.15–1.33 (m,12H), 1.50–1.70 (m,2H), 3.48–3.55 (m,2H), 4.25–4.35 (m,1H), 7.10 (d,2H), 8.35 (d,2H) and 12.50 (s,1H).

EXAMPLE 11

Preparation of 3-(4-(N-1-methylhexyl-N-propyl) aminophenyl)-4-cyano-5-dicyanomethylidene-2-oxo-2,5-dihydropyrrole i) N-(1-Methylhexyl)-N-propylaniline was prepared from N-(1-methylhexyl)aniline (as in Example 2i)) and 1-bromopropane using the same method as in Example 2ii).
ii) 3-(4-(N-(1-methylhexyl)-N-propyl)amino)phenyl)-4-cyano-5-dicyanomethylidene-2-oxo-2,5-dihydropyrrole was prepared from N-(1-methylhexyl)-N-propylaniline using the same method as in Example 2iii). The material showed the following properties: λmax (CH$_{2Cl2}$) 661 nm and δH (250 MH$_z$, d$_6$DMSO), 0.80 (t,3H), 0.90 (t,3H), 1.1–1.25 (m,9H), 1.4–1.6 (m,4H), 3.25–3.45 (m,2H), 4.25–4.35 (m,1H), 7.10 (d,2H), 8.30 (d,2H) and 12.5 (s,1H).

EXAMPLE 12

Preparation of 3-(4-(N-n-heptyl-N-(1-methylbutyl) amino)phenyl)-4-cyano-5-dicyanomethylidene-2-oxo-2,5-dihydropyrrole i) N-(1-methylbutyl)aniline was prepared from aniline and propan-2-one using the same method as in Example 2i)a).
ii) N-n-heptyl-N-(1-methylbutyl)aniline was prepared from N-(1-methyl butyl)aniline and 1-heptylbromide using the same method as in Example 2ii).
iii) 3-(4-(N-n-heptyl-N-(1-methylbutyl)amino)phenyl)-4-cyano-5-dicyanomethylidene-2-oxo-2,5-dihydropyrrole was prepared from N-n-heptyl-N-(1-methylbutyl)aniline using the same method as in Example 2iii). The material showed the following properties: λmax (CH$_2$Cl$_2$) 661 nm (εmax 59779) and δH (250 MH$_z$, CDCl$_3$) 0.90–1.00 (m,6H), 1.20–1.40 (m,11H), 1.45–1.65 (m,6H), 3.35–3.45 (m,2H), 4.10–4.20 (m,1H), 6.85 (d,2H), 8.35 (s,1H) and 8.55 (d,2H) ppm.

EXAMPLES 13–61

Examples 13–61 are dyes of Formula (1) in which R$^4$ is —CN, R$^3$ is —H, W is oxygen and D is a group of Formula (2) and are prepared by the method of Examples 1, 2 or 3. Where substituents other than —H are present in Ring A their positions are expressed relative to the 4—NR$^1$R$^2$ group.

| Example | R¹ | R² | Ring A substitutents | Comments/Analysis |
|---|---|---|---|---|
| 13 | —CH$_2$CH$_2$OCH$_2$CH$_2$— | | all H | δH(250MHz, D$_6$DMSO), 3.50–3.65(m, 4H), 3.70–3.80(m, 4H), 7.15–7.25(d, 2H), 8.25–8.35(d, 2H), 12.55(s, 1H) |
| 14 | n-C$_4$H$_9$ | n-C$_7$H$_{15}$ | all H | δH(250MHz, CDCl$_3$), 0.8–0.90(tr, 3H), 0.90–1.00(tr, 3H), 1.20–1.50(m, 8H), 1.6–1.75 (bs, 6H), 3.4–3.55(tr, 4H), 6.70–6.80 (d, 2H), 8.55–8.65(d, 2H), 8.75(s, 1H) |
| 15 | n-C$_6$H$_{13}$ | n-C$_8$H$_{17}$ | all H | δH(250MHz, CDCl$_3$), 0.85–1.05(m, 6H), 1.20–1.50(m, 12H), 1.60–1.80(bs, 8H), 3.90–4.00(tr, 4H), 6.70–6.85(d, 2H), 8.55 (s, 1H), 8.55–8.65(d, 2H) |
| 16 | n-C$_4$H$_9$ | n-C$_9$H$_{19}$ | all H | δH(400MHz, CDCl$_3$), 0.9(tr, 3H), 1.0(tr, 3H), 1.2–1.45(m, 10H), 1.6–1.8(bs, 8H), 3.4–3.5(m, 4H), 6.7–6.8(d, 2H), 8.5(s, 1H), 8.55–8.65(d, 2H) |
| 17 | n-C$_7$H$_{15}$ | n-C$_9$H$_{19}$ | all H | δH(250MHz, CDCl$_3$); 0.9–1.0(m, 6H), 1.2–1.4(bm, 16H), 1.65(s, 4H), 1.65–1.75 (m, 4H), 3.40–3.55(tr, 4H), 6.70–6.80 (d, 2H), 8.40(s, 1H), 8.55–8.60(d, 2H) |
| 18 | —CH(C$_2$H$_5$)2 | n-C$_8$H$_{17}$ | all H | λmax(CH$_2$Cl$_2$)=661nm. |
| 19 | cyclohexyl | n-C$_8$H$_{17}$ | all H | δH(250MHz, CDCl$_3$), 0.8–0.9(s, 3H), 1.20–1.40(m, 14H), 1.60–1.70(s, 4H), 1.80–2.00 (tr, 4H), 3.30–3.45(tr, 2H), 3.80–3.95 (tr, 1H), 6.85–6.90(d, 2H), 8.50–8.60 (d, 2H), 8.70(s, 1H) |
| 20 | n-C$_8$H$_{17}$ | n-C$_8$H$_{17}$ | all H | δH(250MHz, CDCl$_3$), 0.85–0.95(s, 6H), 1.20–1.50(m, 16H), 1.60–1.80(bs, 8H), 3.40–3.55(tr, 4H), 6.70–6.80(d, 2H), 8.50 (s, 1H), 8.55–8.65(d, 2H) |
| 21 | —CH$_2$CH(C$_2$H$_5$)(CH$_2$)$_3$CH$_3$ | —CH$_2$CH(C$_2$H$_5$)(CH$_2$)$_3$CH$_3$ | all H | δH(250MHz, CDCl$_3$), 0.85–1.00(m, 12H), 1.20–1.40(bs, 16H), 1.80–1.90(m, 2H), 3.35–3.50(m, 4H), 6.75–6.85(d, 2H), 8.45–8.65(d, 2H), 8.45–8.60(bs, 1H), 8.50–8.60 (d, 2H) |
| 22 | cyclohexyl | —CH$_2$CH(C$_2$H$_5$)(CH$_2$)$_3$CH$_3$ | all H | δH(400MHz, CDCl$_3$), 0.85–0.95(m, 6H), 1.20–1.40(m, 6H), 1.50–1.65(s, 10H), 1.75–1.85 (d, 1H), 1.90–2.00(m, 2H), 3.35–3.40 (d, 2H), 3.80–3.90(tr, 1H), 6.85–6.95 (d, 2H), 8.30(s, 1H), 8.50–8.65(d, 2H) |
| 23 | —CH(CH$_3$)CH$_2$CH$_3$ | —CH$_2$CH(C$_2$H$_5$)(CH$_2$)$_3$CH$_3$ | all H | λmax(CH$_2$Cl$_2$)=664nm |
| 24 | —CH(CH$_3$)(CH$_2$)$_4$CH$_3$ | n-C$_7$H$_{15}$ | all H | δH(250MHz, CDCl$_3$), 0.80–0.90(m, 6H), 1.25–1.50(m, 18H), 1.60–1.75(m, 3H), 3.30–3.55 (m, 2H), 4.15–4.25(q, 1H), 6.80–6.90 (d, 2H), 8.55–8.65(d, 2H), 8.80(s, 1H) |
| 25 | —CH(C$_2$H$_5$)CH$_2$CH(CH$_3$)C$_2$H$_5$ | n-C$_7$H$_{15}$ | all H | δH(250MHz, CDCl$_3$), 0.80–1.00(m, 12H), 1.10–1.50(m, 12H), 1.60–1.80(bs, 5H), 3.30–3.45(m, 2H), 4.05–4.20(m, 1H), 6.80–6.95(d, 2H), 8.55(s, 1H), 8.55–8.65(d, 2H) |
| 26 | n-C$_4$H$_9$ | —CH(C$_2$H$_5$)CH$_2$CH(CH$_3$)C$_2$H$_5$ | all H | δH(250MHz, CDCl$_3$), 0.80–0.95(m, 9H), 0.95–1.05(m, 3H), 1.20–1.55(m, 8H), 1.55–1.80 (m, 5H), 3.25–3.40(m, 2H), 4.00–4.25 (m, 1H), 6.80–6.95(d, 2H), 8.50–8.65 (d, 2H), 8.65–8.75(s, 1H) |
| 27 | n-C$_5$H$_{11}$ | —CH$_2$CH(C$_2$H$_5$)(CH$_2$)$_3$CH$_3$ | all H | δH(250MHz, CDCl$_3$), 0.75–1.00(m, 9H), 1.25–1.50(m, 12H), 1.60–1.70(m, 3H), 3.35–3.60 (m, 4H), 6.70–6.85(d, 2H), 8.45(s, 1H), 8.50–8.65(d, 2H) |
| 28 | n-C$_4$H$_9$ | —(CH$_2$)$_2$CH(CH$_3$)CH$_2$C(CH$_3$)$_3$ | all H | δH(250MHz, CDCl$_3$), 0.95(s, 9H), 0.95–1.05 (m, 6H), 1.15–1.25(m, 1H), 1.55–1.70 (m, 8H), 3.40–3.55(m, 4H), 6.70–6.80 (d, 2H), 8.10(s, 1H), 8.50–8.60(d, 2H) |
| 29 | —(CH$_2$)$_2$CH(CH$_3$)CH$_2$C(CH$_3$)$_3$ | n-C$_7$H$_{15}$ | all H | δH(250MHz, CDCl$_3$), 0.90(s, 9H), 1.05(d, 3H), 1.15–1.25(m, 3H), 1.30–1.45(m, 10H), 1.60–1.75(m, 5H), 3.40–3.50(m, 4H), 6.70–6.80(d, 2H), 8.50(s, 1H), 8.55–8.65(d, 2H) |
| 30 | —CH$_2$CH(C$_2$H$_5$)(CH$_2$)$_3$CH$_3$ | n-C$_7$H$_{15}$ | all H | δH(250MHz, CDCl$_3$), 0.85–1.00(m, 6H), 1.25–1.50(m, 13H), 1.60(s, 8H), 1.75–1.90 (m, 1H), 3.35–3.45(d, 2H), 3.45–3.55 (m, 2H), 6.70–6.85(d, 2H), 8.40(s, 1H), 8.50–8.60(d, 2H) |
| 31 | n-C$_4$H$_9$ | n-C$_7$H$_{15}$ | 3-C$_2$H$_5$ | δH(250MHz, D$_6$DMSO), 0.75–0.9(tr, 6H), 1.15–1.30(m, 13H), 1.40–1.55(m, 4H), 2.60–2.70(q, 2H), 3.15–3.25(tr, 4H), 7.15–7.25 (d, 1H), 8.0–8.10(d, 1H), 8.15(s, 1H), 12.55(s, 1H) |
| 32 | n-C$_4$H$_9$ | —CH$_2$CH(C$_2$H$_5$)(CH$_2$)$_3$CH$_3$ | 3-C$_2$H$_5$ | M/Z EI 457, 414, 401, 358, 302, 233, 190, 134 |

-continued

| Example | R¹ | R² | Ring A substitutents | Comments/Analysis |
|---|---|---|---|---|
| 33 | cyclohexyl | n-C₇H₁₅ | all H | δH(250MHz, CDCl₃), 0.90(m, 3H), 1.25–1.40 (m, 8H), 1.40–1.55(m, 2H), 1.60(s, 6H), 1.65–1.80(d, 1H), 1.80–2.00(m, 3H), 3.35–3.45(m, 2H), 3.80–3.90(m, 1H), 6.75–6.90 (d, 2H), 8.50–8.60(d, 2H), 8.65(s, 1H) |
| 34 | n-C₄H₉ | n-C₇H₁₅ | 3-F | δH(250MHz, D₆DMSO), 0.80–1.0(m, 6H), 1.20–1.40(m, 10H), 1.5–1.65(m, 4H), 3.45–3.60 (m, 4H), 7.05–7.20(tr, 1H), 8.05–8.20 (d, 1H), 8.15(s, 1H), 12.55(s, 1H) |
| 35 | —(CH₂)₂CH(CH₃)₂ | CH₂CH(C₂H₅)(CH₂)₃CH₃ | all H | δH(250MHz, CDCl₃), 0.85–1.00(m, 6H), 1.00–1.10(m, 6H), 1.25–1.45(m, 7H), 1.50–1.90 (m, 5H), 3.35–3.45(d, 2H), 3.45–3.60 (m, 2H), 6.75–6.85(d, 2H), 8.55–8.65 (d, 2H), 8.95–9.10(bs, 1H) |
| 36 | —(CH₂)₂CH(CH₃)₂ | n-C₇H₁₅ | all H | δH(250MHz, CDCl₃), 0.85–0.95(m, 3H),1.00–1.05(d, 6H), 1.25–1.4–(m, 8H), 1.50–1.75 (m, 5H), 3.40–3.55(m, 4H), 6.70–6.80 (d, 2H), 8.50–8.60(d, 2H), 8.80–8.90(s, 1H) |
| 37 | n-C₄H₉ | n-C₇H₁₅ | 2-F | δH(250MHz, D₆DMSO), 0.8–1.00(m, 6H), 1.20–1.45(m, 10H), 1.50–1.70(m, 4H), 3.40–3.55 (m, 4H), 6.70–6.85(d, 1H), 6.75(s, 1H), 7.75–7.90(tr, 1H), 12.55(s, 1H) |
| 38 | —CH₂CH(CH₃)₂ | n-C₇H₁₅ | all H | δH(250MHz, CDCl₃), 0.90(m, 3H), 1.05(d, 6H), 1.30–1.40(m, 6H), 1.60–1.70(s, 4H), 2.05–2.25(m, 1H), 3.30–3.40(d, 2H), 3.45–3.55(m, 2H), 6.70–6.80(d, 2H), 8.50–8.60(d, 2H), 8.65(s, 1H) |
| 39 | —CH(C₂H₅)₂ | n-C₇H₁₅ | all H | δH(250MHz, CDCl₃), 0.90(tr, 9H), 1.20–1.40 (m, 8H), 1.60–1.80(m, 6H), 3.20–3.40(m, 2H), 3.85–4.00(m, 1H), 6.80–6.95(d, 2H), 8.40(s, 1H), 8.50–8.65(d, 2H) |
| 40 | —CH(CH₃)CH₂CH₃ | n-C₈H₁₇ | all H | δH(250MHz, CDCl₃), 0.90(m, 6H), 1.25–1.50 (m, 13H), 1.55–1.75(m, 4H), 3.30–3.45 (m, 2H), 4.00–4.20(q, 1H), 6.80–6.95 (d, 2H), 8.40(s, 1H), 8.50–8.60(d, 2H) |
| 41 | —CH(CH₃)(CH₂)₂CH₃ | n-C₈H₁₇ | all H | δH(250MHz, CDCl₃), 0.85–1.00(m, 6H), 1.25–1.00(m, 12H), 1.55–1.75(m, 7H), 3.25–3.50 (m, 2H) 4.15–4.30(q, 1H), 6.80–6.95(d, 2H), 8.40(s, 1H), 8.50–8.65(d, 2H) |
| 42 | —CH(CH₃)CH₂CH(CH₃)₂ | n-C₇H₁₅ | all H | δH(250MHz, CDCl₃), 0.85–1.00(m, 9H), 1.30 (d, 2H), 1.30–1.50(m, 8H), 1.50–1.75 (m, 5H), 3.30–3.45(m, 2H), 4.20–4.35 (q, 1H), 6.80–6.95(d, 2H), 8.40(s, 1H), 8.50–8.65(d, 2H) |
| 43 | n-C₅H₁₁ | —CH(C₂H₅)(CH₂)₃CH₃ | all H | δH(250MHz, CDCl₃), 0.80–1.00(m, 9H), 1.20–1.50(m, 8H), 1.50–1.75(m, 6H), 3.25–3.40 (m, 2H), 3.90–4.15(m, 1H), 6.80–6.95 (d, 2H), 8.50–8.65(d, 2H), 9.00(s, 1H) |
| 44 | n-C₅H₁₁ | —CH(C₃H₇)₂ | all H | δH(250MHz, CDCl₃), 0.85–1.05(m, 9H), 1.25–1.50(m, 8H), 1.55–1.75(m, 6H), 3.25–3.40 (m, 2H), 4.05–4.20(bs, 1H), 6.80–6.95 (d, 2H), 8.55–8.65(d, 2H), 8.85–8.95(s, 1H) |
| 45 | n-C₅H₁₁ | —CH(CH₃)(CH₂)₄CH₃ | all H | δH(250MHz, CDCl₃), 0.85–1.05(m, 6H), 1.25–1.50(m, 12H), 1.55–1.80(m, 5H), 3.20–3.45 (m, 2H), 4.15–4.30(q, 1H), 6.80–6.95 (d, 2H), 8.55–8.65(d, 2H), 9.30(s, 1H) |
| 46 | n-C₆H₁₃ | —CH(CH₃)(CH₂)₄CH₃ | all H | δH(250MHz, CDCl₃), 0.85–1.05(m, 6H), 1.25–1.55(m, 14H), 1.55–1.80(m, 5H), 3.30–3.50 (m, 2H), 4.15–4.30(q, 1H), 6.80–695 (d, 2H), 8.55–8.65(d, 2H), 9.00–9.15(s, 1H) |
| 47 | —C₂H₅ | —CH₂CH(C₂H₅)(CH₂)₃CH₃ | all H | δH(250MHz, CDCl₃), 0.70–1.00(m, 6H), 1.20–1.50(m, 11H), 1.75–1.95(m, 1H), 3.35–3.45 (d, 2H), 3.50–3.60(q, 2H), 6.70–6.90 (d, 2H), 8.50–8.65(d, 2H), 8.90(s, 1H) |
| 48 | —CH(CH₃)CH₂CH(CH₃)₂ | n-C₈H₁₇ | all H | λmax(CH₂Cl₂)=663nm |
| 49 | —CH(CH₃)₂ | n-C₈H₁₇ | all H | λmax(CH₂Cl₂)=663nm |
| 50 | n-C₄H₉ | —CH(CH₃)(CH₂)₂CH(CH₃)₂ | all H | λmax(CH₂Cl₂)=662nm |
| 51 | n-C₅H₁₁ | —CH(C₂H₅)CH₂CH(CH₃)CH₂CH₃ | all H | λmax(CH₂Cl₂)=663nm |
| 52 | —(CH₂)₂CN | —CH₂CH(C₂H₅)(CH₂)₃CH₃ | all H | δH(250MHz, D₆DMSO), 0.80–0.95(tr, 6H), 1.15–1.35(m, 8H), 1.75–1.90(m, 1H), 2.75–2.90(tr, 2H), 3.40–3.50(d, 2H), 3.80–3.90 (tr, 2H), 6.95–7.10(d, 2H), 8.15–8.30 (d, 2H), 12.60(s, 1H) |
| 53 | —(CH₂)₂COCH₃ | —CH₂CH(C₂H₅)(CH₂)₃CH₃ | all H | δH(250MHz, D₆DMSO), 0.80–0.95(m, 6H), 1.20–1.40(m, 8H), 1.75–1.95(m, 1H), 2.15 (s, 3H), 2.75–2.90(m, 2H), 3.40–3.50 (m, 2H), 3.65–3.75(m, 2H), 6.90–7.0(d, 2H), |

-continued

| Example | R¹ | R² | Ring A substitutents | Comments/Analysis |
|---|---|---|---|---|
| 54 | —(CH₂)₂CH=CH₂ | —CH(CH₃)(CH₂)₄CH₃ | all H | 8.3–8.4(d, 2H), 12.6(s, 1H) δH(250MHz, D₆DMSO), 0.8–0.9(m, 3H), 1.10–1.30(m, 9H), 1.50–1.70(m, 2H), 2.20–2.40 (m, 2H), 3.35–3.50(m, 2H), 4.20–4.40 (m, 1H), 5.10(d, 1H), 5.20(d, 1H), 5.80–6.00(m, 1H), 7.0–7.15(d, 2H), 8.35–8.50(d, 2H), 12.55(s, 1H). |
| 55 | —CH(CH₃)CH₂CH₃ | —(CH₂)₇CH=CH₂ | all H | δH(250MHz, D₆DMSO), 0.75–0.90(tr, 3H), 1.20–1.30(d, 2H), 1.30–1.45(m, 6H), 1.45–1.70(m, 2H), 1.95–2.10(m, 2H), 4.15–4.30 (m, 1H), 4.90–5.10(m, 2H), 5.75–5.95 (m, 1H), 7.05–7.15(d, 2H), 8.30–8.40 (d, 2H), 12.55(s, 1H) |
| 56 | —(CH₂)₂CO₂C₂H₅ | —CH₂CH(C₂H₅)(CH₂)₃CH₃ | all H | δH(250MHz, D₆DMSO), 0.8–1.0(tr, 6H), 1.15–1.20(tr, 3H), 1.20–1.40(m, 8H), 1.70–1.85 (m, 1H), 2.10–2.25(tr, 2H), 3.40–3.50 (d, 2H), 3.75–3.90(tr, 2H), 4.00–4.15 (q, 2H), 6.95–7.05(d, 2H) 8.25–8.40(d,2H), 12.55(s, 1H) |
| 57 | —(CH₂)₄OCOCH(CH₃)₂ | —CH(CH₃)(CH₂)₄CH₃ | all H | δH(250MHz, CDCl₃), 0.85–0.95(tr, 3H), 1.10–1.20(d,6H), 1.20–1.40(m,9H), 1.50–1.90(m, 6H), 2.45–2.65(m, 1H), 3.35–3.50 (m, 2H), 4.10–4.25(m, 3H), 6.80–6.90 (d, 2H), 8.45–8.55(d, 2H), 9.45(s, 1H) |
| 58 | (CH₂)₄OCH₂phenyl | —CH(CH₃)(CH₂)₄CH₃ | all H | δH(250MHz, D₆DMSO), 0.8–0.95(tr, 3H), 1.10–1.30(d, 9H), 1.50–1.70(m, 6H), 3.35–3.45(m, 2H), 3.45–3.55(m, 2H), 4.20–4.40 (m, 1H), 4.50(s, 2H), 7.0–7.15(d, 2H), 7.20–7.45(m, 5H), 8.30–8.45(d, 2H), 12.55(s, 1H) |
| 59 | CH₂COphenyl | —CH(CH₃)(CH₂)₄CH₃ | all H | δH(250MHz, D₆DMSO), 0.8–1.0(m, 3H), 1.15–1.25(d, 3H), 1.25–1.50(m, 6H), 1.60–1.80 (m, 2H), 4.40–4.60(m, 2H), 5.10–5.40 (q, 2H), 6.85–7.25(m, 2H), 7.60–7.70 (tr, 2H), 7.75–7.85(tr, 1H), 8.15–8.25 (d, 2H), 8.25–8.40(d, 2H), 12.65(s, 1H) |
| 60 | —(CH₂)₂NHCOCH₃ | —CH₂CH(C₂H₅)(CH₂)₃CH₃ | all H | δH(250MHz, CDCl₃), 0.85–1.05(m, 6H), 1.15–1.40(m, 8H), 1.40–1.60(m, 1H), 1.95(s, 3H), 3.40–3.60(m, 4H), 3.70–3.80(m, 2H), 6.15–6.30(tr, 1H), 6.85–7.00(d, 2H), 7.45 (s, 1H), 8.50–8.60(d, 2H) |
| 61 | —CH₂C=CH₂<br>    \|<br>    CH₃ | n-C₇H₁₅ | all H | δH(250MHz, CDCl₃), 0.85–1.05(tr, 3H), 1.20–1.40(m,6H), 1.50–1.65(m, 5H), 1.65–1.75(m, 2H), 3.40–3.55(tr, 2H), 4.05 (s, 2H), 4.65(s, 1H), 4.95(s,1H), 4.60–4.70(d, 2H), 8.25(s, 1H), 8.50–8.60(d, 2H) |

EXAMPLES 62–63

Examples 62–63 are dyes of Formula (1) in which R⁴ is —CN, R³ is —H, W is oxygen and D is a group of Formula (3) and are prepared by the method of Example 1.

| Example | R¹ | R⁶ | Ring A substitutents | Comments/Analysis |
|---|---|---|---|---|
| 62 | n-C₄H₉ | —CH₂cyclohexyl | all H | δH(250MHz,CDCl₃), 0.75–0.95(m,3H), 0.95–1.05(m,2H), 1.10–1.50(m,10H), 1.65–1.80(m,3H), 3.20–3.30(d,2H), 3.45–3.55(tr,2H), 6.70–6.85(d,2H), 8.50–8.60(d,2H), 8.65(s,1H) |
| 63 | n-C₅H₁₁ | 2-methyl-cyclohexyl | all H | δH(250MHz,CDCl₃), 0.85–1.0(m,6H), 1.15–1.50(m,10H), 1.65–1.85 (m,2H), 1.85–2.00 (m,2H), 2.15–2.40 (m,1H), 3.25–3.55 (m,2H), 3.90–4.05 (m,1H), 6.70–6.85 (d,2H), 8.40–8.55 (d,2H), 8.80(s,1H) |

EXAMPLE 64

1-Benzyl-3-(4-(N-pentyl-N-1-methylpentyl) aminophenyl)-4-cyano-5-dicyanomethylidene-2-oxo-2,5-dihydropyrrole To a stirred solution of 3-(4-(N-pentyl-N-1-methylpentyl) aminophenyl)-4-cyano-5-dicyanomethylidene-2-oxo-2,5-dihydropyrrole (2 parts) in dry N,N-dimethylformamide (25 parts) at 40° C. was added a 60% dispersion of sodium hydride in mineral oil (0.3 parts) followed by benzyl bromide (1.3 parts). The mixture was stirred at 75° C. for 1.5 hours, cooled and added to a mixture of ice and acetone. The product was collected by filtration and washed with aqueous acetone to give 1-benzyl-3-(4-(N-pentyl-N-1-methylpentyl)-aminophenyl)-4-cyano-5-dicyanomethylidene-2-oxo-2,5-dihydropyrrole (1 part). λmax ($CH_2Cl_2$) 666 nm, δH(250 MHz,$D_6$DMSO) 0.80–1.00(m,6H), 1.20–1.30(d,3H), 1.20–1.45 (m,4H), 1.50–1.75(m,4H), 3.40–3.55(m,2H), 4.25–4.45(q,1H), 5.25(s,2H), 7.05–7.15(d,2H), 7.20–7.50 (m,5H), 8.30–8.55(d,2H).

EXAMPLES 65–76

Examples 65–76 are dyes of Formula (1) in which $R^4$ is —CN, W is oxygen, D is a group of Formula (2) and Ring A carries no further substituents and are prepared by reacting the corresponding dye of Formula (1) in which $R^3$=—H in a liquid (dimethylformamide or tetrahydrofuran) in the presence of a base ($K_2CO_3$ or NaH) at a temperature from 0° C. to 120° C. with an appropriate alkylating or acylating agent (allylbromide, methyliodide, benzoylchloride, propionic anhydride, 3-methylbutyrylchloride, 1-methylpropylbromide or benzylbromide) as illustrated by Example 64.

| Example | $R^1$ | $R^2$ | $R^3$ | Comments/Analysis |
|---|---|---|---|---|
| 65 | n-$C_4H_9$ | —CH($CH_3$)($CH_2$)$_4$$CH_3$ | —$CH_2$CH=$CH_2$ | λmax($CH_2Cl_2$) = 666 nm |
| 66 | n-$C_4H_9$ | —CH($CH_3$)($CH_2$)$_4$$CH_3$ | —$CH_3$ | λmax($CH_2Cl_2$) = 665 nm |
| 67 | n-$C_4H_9$ | —CH($CH_3$)($CH_2$)$_4$$CH_3$ | —COPhenyl | greenish blue |
| 68 | n-$C_4H_9$ | —CH($CH_3$)($CH_2$)$_4$$CH_3$ | —CO$C_2H_5$ | greenish blue |
| 69 | n-$C_4H_9$ | —CH($CH_3$)($CH_2$)$_4$$CH_3$ | —CO$CH_2$CH($CH_3$)$_2$ | greenish blue |
| 70 | n-$C_4H_9$ | —CH($CH_3$)($CH_2$)$_4$$CH_3$ | —CH($CH_3$)$CH_2$$CH_3$ | λmax($CH_2Cl_2$) = 666 nm |
| 71 | n-$C_4H_9$ | —CH($CH_3$)($CH_2$)$_4$$CH_3$ | —$CH_2$phenyl | λmax($CH_2Cl_2$) = 666 nm |
| 72 | n-$C_3H_7$ | —$CH_2$CH($C_2H_5$)($CH_2$)$_3$$CH_3$ | —$CH_2$CH=$CH_2$ | λmax($CH_2Cl_2$) = 666 nm |
| 73 | n-$C_3H_7$ | —$CH_2$CH($C_2H_5$)($CH_2$)$_3$$CH_3$ | —$CH_3$ | λmax($CH_2Cl_2$) = 665 nm |
| 74 | n-$C_3H_7$ | —$CH_2$CH($C_2H_5$)($CH_2$)$_3$$CH_3$ | —COphenyl | greenish blue |
| 75 | n-$C_3H_7$ | —$CH_2$CH($C_2H_5$)($CH_2$)$_3$$CH_3$ | —$CH_2$phenyl | λmax($CH_2Cl_2$) = 666 nm |
| 76 | —CH($CH_3$)$CH_2$$CH_3$ | n-$C_7H_{15}$ | —$CH_2$CH=$CH_2$ | λmax($CH_2Cl_2$) = 666 nm |

EXAMPLES 77–87

Examples 77–87 are dyes of Formula (1) in which $R^4$ is —CN, $R^3$ is —H, W is oxygen and D is a group of Formula (3) and Ring A carries no further substituents and are prepared by the method of Example 1.

| Example | $R^1$ | $R^2$ | Comments/Analysis |
|---|---|---|---|
| 77 | $C_2H_5$ | n-$C_4H_9$ | |
| 78 | $C_2H_5$ | n-$C_6H_{13}$ | δH(250MHz, $CDCl_3$), 0.85–0.95(tr, 3H), 1.20–1.30(m, 6H), 1.30–1.40(m, 3H), 1.60–1.70(m, 2H), 3.40–3.50(tr, 2H), 3.50–3.65(q, 2H), 6.70–6.8(d, 2H), 8.15(s, 1H), 8.50–8.60(d, 2H) |
| 79 | —$CH_2$CH($CH_3$)$_2$ | —$CH_2$CH($CH_3$)$_2$ | δH(250MHz, $CDCl_3$), 0.9–1.05(d, 12H), 2.05–2.25(m, 2H), 3.30–3.45(d, 4H), 6.70–6.85(d, 2H), 8.50–8.60(d, 2H), 8.55–8.70(s, 1H) |
| 80 | n-$C_6H_{13}$ | —CH($C_2H_5$)$_2$ | δH(250MHz, $CDCl_3$), 0.85–1.00(m, 9H), 1.25–1.50(m, 6H), 1.65–1.80(m, 6H), 3.25–3.40(m, 2H), 3.85–4.0(m, 1H), 6.80–6.95(d, 2H), 8.40(s, 1H), 8.55–8.65(d, 2H) |
| 81 | n-$C_6H_{13}$ | —CH($CH_3$)$C_2H_5$ | δH(400MHz, $CDCl_3$), 0.85–0.95(tr, 6H), 1.25(s, 3H), 1.25–1.40(m, 6H), 1.60–1.80(m, 4H), 3.25–3.35(q, 2H), 4.05–4.15(tr, 1H), 6.80–6.90(d, 2H), 8.50–8.60(d, 2H), 8.70(s, 1H) |
| 82 | n-$C_5H_{11}$ | —CH($CH_3$)($CH_2$)$_3$$CH_3$ | δH(400MHz, $CDCl_3$), 0.85–1.00(m, 6H), 1.20–1.50(m, 11H), 3.30–3.45(tr, 2H), 4,15–4.30(q, 1H), 6.80–6.95(d, 2H), 8.50–8.60(d, 2H), 9.65(s, 1H) |
| 83 | n-$C_4H_9$ | —$CH_2$C=$CH_2$<br>\|<br>$CH_3$ | δH(250MHz, $D_6$DMSO), 0.85–1.00(tr, 3H), 1.25–1.45(m, 2H), 1.50–1.70(m, 2H), 1.75(s, 3H), 3.40–3.55(m, 2H), 4.10(s, 2H), 4.6(s, 1H), 4.85(s, 1H), 6.90–7.00(d, 2H), 8.25–8.35(d, 2H), 12.55(s, 1H) |

-continued

| Example | $R^1$ | $R^2$ | Comments/Analysis |
|---|---|---|---|
| 84 | n-$C_4H_9$ | —$CH(CH_3)C_2H_5$ | δH(250MHz, $D_6$DMSO), 0.75–0.90(tr, 3H), 0.90–1.00 (tr, 3H), 1.15–1.25(d, 3H), 1.40–1.50(m, 2H), 1.50–1.70(m, 4H), 3.45–3.55(m, 2H), 4.15–4.30(m, 1H), 7.00–7.15(d, 2H), 8.25–8.40(d, 2H), 12.55(s, 1H) |
| 85 | —$CH(CH_3)C_2H_5$ | —$C_4H_8OCOCH_2$phenyl | |
| 86 | —CH $(CH_3)C_2H_5$ | —$C_2H_4COOCH_2CH(C_2H_5)(CH_2)_3CH_3$ | |
| 87 | —$CH(CH_3)(CH_2)_3CH_3$ | —$CH_2CO$phenyl | |

EXAMPLES 88–93

Examples 88–93 are dyes of Formula (1) in which $R^4$ is —CN, $R^3$ is —H, W is oxygen and D is a group of Formula (3) and are prepared by the method of Examples 1, 2 or 3. The positions of substituents in Ring A are expressed relative to the 4—$NR^1R^6$ group.

| Example | $R^1$ | $R^6$ | Ring A | Comments/Analysis |
|---|---|---|---|---|
| 88 | —$C_2H_5$ | n-$C_6H_{13}$ | 3-$C_2H_5$ | mid blue |
| 89 | n-$C_4H_9$ | n-$C_6H_{13}$ | 2-F | mid blue |
| 90 | —$C_2H_5$ | n-$C_4H_9$ | 3-F | mid blue |
| 91 | —$CH(CH_3)C_2H_5$ | n-$C_4H_9$ | 3-$CH_3$ | mid blue |
| 92 | —$CH(CH_3)C_2H_5$ | n-$C_4H_9$ | 3-Cl | mid blue |
| 93 | —$CH(CH_3)C_2H_5$ | n-$C_4H_9$ | 2-CN | mid blue |

EXAMPLES 94–109

Examples 94–109 are dyes of Formula (1) in which $R^4$ is —CN, W is oxygen, D is a group of Formula (3) and Ring A carries no further substituent groups and are prepared by the methods of Examples 65–76.

| Example | $R^1$ | $R^6$ | $R^3$ | Comments/Analysis |
|---|---|---|---|---|
| 94 | —$CH(CH_3)C_2H_5$ | n-$C_4H_9$ | —$CH_2$—CH=$CH_2$ | λmax($CH_2Cl_2$) = 666 nm |
| 95 | —$CH(CH_3)C_2H_5$ | n-$C_4H_9$ | —$CH_3$ | λmax($CH_2Cl_2$) = 665 nm |
| 96 | —$CH(CH_3)C_2H_5$ | n-$C_4H_9$ | —$CH_2$phenyl | λmax($CH_2Cl_2$) = 666 nm |
| 97 | —$CH(CH_3)C_2H_5$ | n-$C_4H_9$ | —COphenyl | greenish blue |
| 98 | —$CH(CH_3)C_2H_5$ | n-$C_4H_9$ | —$COC_2H_5$ | greenish blue |
| 99 | —$CH(CH_3)C_2H_5$ | n-$C_4H_9$ | —$CH(CH_3)C_2H_5$ | λmax($CH_2Cl_2$) = 666 nm |
| 100 | —$C_2H_5$ | n-$C_6H_{13}$ | —$CH_2$—CH=$CH_2$ | λmax($CH_2Cl_2$) = 666 nm |
| 101 | —$C_2H_5$ | n-$C_6H_{13}$ | —$CH_3$ | λmax($CH_2Cl_2$) = 665 nm |
| 102 | —$C_2H_5$ | n-$C_6H_{13}$ | —$CH_2$phenyl | λmax($CH_2Cl_2$) = 666 nm |
| 103 | —$C_2H_5$ | n-$C_6H_{13}$ | —COphenyl | greenish blue |
| 104 | —$C_2H_5$ | n-$C_6H_{13}$ | —$COC_2H_5$ | greenish blue |
| 105 | —$C_2H_5$ | n-$C_6H_{13}$ | —$CH(CH_3)C_2H_5$ | λmax($CH_2Cl_2$) = 666 nm |
| 106 | 2-methylcyclohexyl | n-$C_5H_{11}$ | —$CH_2$—CH=$CH_2$ | δH(250MHz,$D_6$DMSO) 0.85–1.05 (m,6H), 1.25–1.55(m,10H), 1.65–2.00 (m,4H), 2.10–2.25(m,1H), 3.6–3.85(m,2H), 4.10–4.25(m,1H), 4.60(s,2H), 5.10–5.30(m,2H), 5.90–6.05(m,1H), 7.05–7.15(d,2H), 8.30–8.50(d,2H) |
| 107 | 2-methylcyclohexyl | n-$C_5H_{11}$ | n-$C_4H_9$ | λmax($CH_2Cl_2$)-665nm |
| 108 | 2-methylcyclohexyl | n-$C_5H_{11}$ | —COphenyl | greenish blue |
| 109 | 2-methylcyclohexyl | n-$C_5H_{11}$ | —$COCH_2CH(CH_3)_2$ | greenish blue |

EXAMPLE 110

Preparation of 3-(1-heptyl-2,3-dihydro-1H-indol-5-yl)-4-cyano-5-dicyanomethylidene-2-oxo-2,5-dihydropyrrole i) Sodium metal (6.9 parts) was added to absolute ethanol (130 parts) in small portions over about 1 hour allowing the temperature to rise to approximately 60° C. The solution of sodium ethoxide thus formed was cooled to 30° C. and diethyloxalate (22.5 parts) was added over about 10 minutes whilst maintaining the temperature at 30° C. to 35° C. Malononitrile dimer (19.7 parts, ex Lonza Chemicals) was added over about 15 minutes whilst maintaining the temperature at 35° C. to 40° C.

The reaction mixture was heated to 60° C. for 30 minutes before cooling to ambient temperature. The precipitated product was collected by filtration, washed with ethanol and dried at 50° C. to give the disodium salt of 4-cyano-5-dicyanomethylidene-3-hydroxy-2-oxo-2,5-dihydropyrrole (33 parts, 96%).

ii) 1-Heptyl-2,3-dihydro-1H-indole

A mixture of indoline (17 parts), 1-bromoheptane (31 parts), potassium carbonate (24 parts) and N,N-dimethylformamide (30 parts) was stirred at 100° C. for 3 days. The cooled mixture was diluted with toluene, washed with water (×4), dried (MgSO$_4$) and evaporated to leave 1-heptyl-2,3-dihydro-1H-indole (30 parts).

iii) A stirred mixture of the disodium salt of 4-cyano-5-dicyano-methylidene-3-hydroxy-2-oxo-2,5-dihydropyrrole (8.7 parts), 1-heptyl- 2,3-dihydro-1H-indole (9.2 parts), acetic anhydride (1.5 parts) and dry N,N-dimethylformamide (70 parts) was cooled to between −10° C. and −15° C. Phosphorus oxychloride (13.4 parts) was added to this dropwise while maintaining the temperature at less than −10° C. The reaction was allowed to warm up to room temperature over 1 hour and then stirred at room temperature for 1 hour. The mixture was poured into a stirred ice-water mixture (300 parts) and 3-(1-heptyl-2,3-dihydro-1H-indol-5-yl)-4-cyano-5-dicyanomethylidene-2-oxo-2,5-dihydropyrrole (9.6 parts) was collected by filtration. The product was further purified by either recrystallisation from acetone or by trituration in warm methanol. λmax (CH$_2$Cl$_2$) 686 nm, δH(250MHz,D$_6$DMSO), 0.8–0.9(tr,3H), 1.15–1.30 (m,8H), 1.50–1.70(m,2H), 3.05–3.20(tr,2H), 3.40–3.50(m, 2H), 4.80–4.95(tr,2H), 6.75–6.85(d,1H), 8.10(s,1H), 8.35–8.45(d,1H), 12.40(s,1H).

EXAMPLES 111–120

Examples 111–120 are dyes of Formula (1) in which R$^4$ is —CN, R$^3$ is —H, W is oxygen, D is a group of Formula (4) in which Z is a direct link and Ring B carries no further substituents and are prepared by the method of Example 110.

EXAMPLE 121

Preparation of 3-(1-butyl-2,2-dimethyl-2,3-dihydro-1H-indol-5-yl)-4-cyano-5-dicyanomethylidene-2-oxo-2,5-dihydropyrrole i) A mixture of N-butylaniline (12.35 parts), anhydrous potassium carbonate (17.1 parts), 3-chloro-2-methylpropene (11.24 parts) and DMF (20 parts) was stirred at 90° C. for 8 hours. The cooled mixture was poured into toluene, washed with water (×2), 1N hydrochloric acid (30 parts) and water (×2). The dried organic phase was evaporated to leave N-butyl-N-(2-methylprop-2-eneyl)aniline (14.3 parts).

ii). A mixture of N-butyl-N-(2-methylprop-2-eneyl)aniline (9.6 parts), zinc chloride (6.12 parts) and xylene (20 parts) was heated under reflux with vigorous stirring for 4.75 hours. The cooled mixture was filtered and the organic phase evaporated to leave 1-butyl-2,2-dimethylindoline (5.3 parts).

iii) 3(1-butyl-2,2-dimethyl-2,3-dihydro-1H-indol-5-yl)-4-cyano-5-dicyanomethylidene-2-oxo-2,5-dihydropyrrole was prepared from 1-butyl-2,2-dimethylindoline using the method of Example 105ii). δH(250 MHz,D$_6$DMSO), 0.85–1.00(tr,3H), 1.30–1.50(m,2H), 1.35(s,6H), 1.50–1.65 (m,2H), 2.95(s,2H), 3.35–3.45(m,2H), 6.70–6.80(d,1H), 8.10(s,1H), 8.35–8.45(d,1H), 12.40(s,1H).

EXAMPLES 122–127

Examples 122–127 are dyes of Formula (1) in which R$^4$ is —CN, R$^3$ is —H, W is oxygen, D is a group of Formula

| Example | R$^1$ | R$^7$ | R$^8$ | R$^9$ | R$^{10}$ | Comments/Analysis |
|---|---|---|---|---|---|---|
| 111 | —CH$_2$CH(C$_2$H$_5$)(CH$_2$)$_3$CH$_3$ | H | H | H | H | δH(250MHz, D$_6$DMSO), 0.80–0.90(tr, 3H), 1.20–1.40 (m, 8H), 1.70–1.85(s, 1H), 3.05–3.20(tr, 2H), 3.25–3.45(m, 2H), 3.75–3.90(tr, 2H), 6.75–6.90(d, 1H), 8.10(s, 1H), 8.35–8.45(d, 1H), 12.35(s, 1H) |
| 112 | CH(CH$_3$)(CH$_2$)$_4$CH$_3$ | CH$_3$ | H | H | H | δH(250MHz, D$_6$DMSO), 0.80–0.95(tr, 3H), 1.20–1.50 (m, 12H), 1.55–1.85(m, 2H), 2.15–2.30(m, 1H), 3.20–3.40(m, 1H), 3.75–3.90(m, 1H), 4.20–4.35(m, 1H), 6.80–6.95(d, 1H), 8.10(s, 1H), 8.35–8.45(d, 1H), 12.35(s, 1H) |
| 113 | n-C$_7$H$_{15}$ | CH$_3$ | H | CH$_3$ | H | δH(250MHz, D$_6$DMSO), 0.80–0.90(tr, 3H), 1.10–1.20 (m, 6H), 1.20–1.35(m, 8H), 1.45–1.70(m, 2H), 3.30–3.70(m, 3H), 4.10–4.30(m, 1H), 6.75–6.90(d, 1H), 8.10(s, 1H), 8.35–8.45(d, 1H), 12.40(s, 1H) |
| 114 | n-C$_7$H$_{15}$ | CH$_3$ | H | CH$_3$ | CH$_3$ | δH(400MHz, D$_6$DMSO), 0.8–0.9(tr, 3H), 1.10(s, 3H), 1.15(d, 3H), 1.20(s, 3H), 1.20–1.30(m, 8H), 1.50–1.65(m, 2H) |
| 115 | CH$_2$CH(C$_2$H$_5$)(CH$_2$)$_3$CH$_3$ | CH$_3$ | H | H | H | δH(250MHz, D$_6$DMSO), 0.80–1.0(m, 6H), 1.20–1.40(m, 11H), 1.65–1.85(s, 1H), 2.15–2.30(m, 1H), 3.20–3.35(m, 1H), 3.35–3.55(m, 2H), 4.10–4.25(m, 1H), 6.70–6.85(d, 1H), 8.10(s, 1H), 8.30–8.45(d, 1H), 12.35(s, 1H) |
| 116 | —CH(C$_2$H$_5$)CH$_2$CH$_3$ | H | H | H | H | δH(250MHz, D$_6$DMSO), 0.80–0.95(tr, 6H), 1.50–1.70 (m, 4H), 3.10–3.20(tr, 2H), 3.65–3.80(tr, 2H), 3.80–3.90(m, 1H), 6.85–7.00(d, 1H), 8.10(s, 1H), 8.35–8.45(d, 1H), 12.35(s, 1H) |
| 117 | n-C$_4$H$_9$ | H | H | H | H | δH(250MHz, D$_6$DMSO), 0.85–1.00(tr, 3H), 1.20–1.40(m, 2H), 1.50–1.70(m, 2H), 3.05–3.20(tr, 2H), 3.40–3.60(tr, 2H), 3.80–3.95(tr, 2H), 6.75–6.90(1H), 8.10(s, 1H), 8.40–8.50(d, 1H), 12.35(s, 1H) |
| 118 | —C$_2$H$_4$CO$_2$CH$_2$CH(C$_2$H$_5$)(CH$_2$)$_3$CH$_3$ | H | H | H | H | δH(250MHz, D$_6$DMSO), 0.80–0.95(m, 6H), 1.20–1.35(m, 8H), 1.40–1.60(m, 1H), 2.15–2.30(tr, 2H), 3.00–3.15(tr, 2H), 3.65–3.80(tr, 2H), 3.80–3.90(tr, 2H), 3.90–4.00(d, 2H), 6.65–6.75(d, 1H), 8.1(s, 1H), 8.30–8.40(d, 1H), 12.35(s, 1H) |
| 119 | —CH(C$_2$H$_5$)CH$_2$CH$_3$ | CH$_3$ | H | H | H | δH(250MHz, D$_6$DMSO), 0.80–1.00(m, 6H), 1.20–1.40(d, 3H), 1.65–1.85(m, 4H), 2.60–2.80(m, 1H), 3.35–3.50(m, 1H), 3.50–3.65(m, 1H), 4.15–4.30(m, 1H), 6.70–6.90(d, 1H), 8.10(s, 1H), 8.30–8.40(d, 1H), 12.35(s, 1H) |
| 120 | —CH(CH$_3$)CH$_2$CO$_2$C$_2$H$_5$ | CH$_3$ | H | H | H | δH(250MHz, D$_6$DMSO), 1.05–1.20(m, 3H), 1.25–1.35(m, 3H), 1.40–1.50(d, 3H), 2.55–2.90(m, 4H), 3.95–4.10(m, 2H), 4.20–4.40(m, 2H), 6.80–6.95(tr, 1H), 8.05(s, 1H), 8.30–8.40(d, 2H), 12.50(s, 1H) |

(4) in which Z is a direct link and Ring B carries no further substituents and are prepared by the method of Example 121.

| Example | $R^1$ | $R^7$ | $R^8$ | $R^9$ | $R^{10}$ | Comments/Analysis |
|---|---|---|---|---|---|---|
| 122 | —CH(CH$_3$)(CH$_2$)$_4$CH$_3$ | CH$_3$ | CH$_3$ | H | H | δH(250MHz, D$_6$DMSO), 0.85–0.95(tr, 3H), 1.2–1.4(m, 12H), 1.7–2.0(m, 2H), 2.95–3.1(s, 2H), 3.6–3.8(m, 1H), 6.95–7.1(d, 1H), 8.15(s, 1H), 8.3–8.45(d, 1H), 12.4(s, 1H) |
| 123 | —CH(C$_2$H$_5$)CH$_2$CH$_3$ | CH$_3$ | CH$_3$ | H | H | δH(250MHz, D$_6$DMSO), 0.85–1.00(tr, 6H), 1.3 (s, 6H), 1.65–1.80(m, 2H), 1.80–2.05(m, 2H), 3.00(s, 2H), 3.25–3.40(m, 1H), 6.85–7.00(d, 2H), 8.10(s, 1H), 8.30–8.45(d, 1H), 12.35(s, 1H) |
| 124 | —CH(CH$_3$)CH$_2$CH$_3$ | CH$_3$ | CH$_3$ | H | H | δH(250MHz, D$_6$DMSO), 0.85–0.95(tr, 3H), 1.25–1.40(m, 9H), 1.75–1.90(m, 2H), 3.00(s, 1H), 3.50–3.65(m, 1H), 6.85–7.00(d, 1H), 8.10(s, 1H), 8.30–8.40(d, 1H), 12.35(s, 1H) |
| 125 | —CH$_2$CH(C$_2$H$_5$)(CH$_2$)$_3$CH$_3$ | CH$_3$ | CH$_3$ | H | H | δH(250MHz, D$_6$DMSO), 0.85–1.00(m, 6H), 1.20–1.35(m, 8H), 1.40(s, 6H), 3.15–3.25(d, 2H), 6.40–6.55(d, 1H), 8.30(s, 1H), 8.45(s, 1H), 8.50–8.60(d, 1H), 12.45(s, 1H) |
| 126 | —CH$_2$CH(C$_2$H$_5$)CH$_2$CH$_3$ | CH$_3$ | CH$_3$ | H | H | greenish blue |
| 127 | phenyl | CH$_3$ | CH$_3$ | H | H | greenish blue |

EXAMPLES 128–130

Examples 128–130 are dyes of Formula (1) in which $R^4$ is —CN, $R^3$ is —H, W is oxygen, D is a group of Formula (4) in which Z is oxygen and Ring B carries no further substituents and are prepared by the method of Example 110.

| Example | $R^1$ | $R^7$ | $R^8$ | $R^9$ | $R^{10}$ | Comments/Analysis |
|---|---|---|---|---|---|---|
| 128 | —CH(CH$_3$)(CH$_2$)$_4$CH$_3$ | CH$_3$ | H | H | H | greenish blue |
| 129 | —CH$_2$CH(C$_2$H$_5$)(CH$_2$)$_3$CH$_3$ | H | H | H | H | greenish blue |
| 130 | —CH(CH$_3$)CH$_2$CH$_3$ | CH$_3$ | CH$_3$ | H | H | greenish blue |

EXAMPLES 131–132

Examples 131–132 are dyes of Formula (1) in which $R^4$ is —CN, $R^3$ is H, W is oxygen, D is a group of Formula (4) in which Z is N—$R^{11}$ and Ring B carries no further substituents and are prepared by the method of Examples 110 and 65 to 76.

| Example | $R^1$ | $R^7$ | $R^8$ | $R^9$ | $R^{10}$ | $R^{11}$ | Comments/Analysis |
|---|---|---|---|---|---|---|---|
| 131 | n-C$_4$H$_9$ | CH$_3$ | H | H | H | n-C$_4$H$_9$ | greenish blue |
| 132 | —CH(CH$_3$)(CH$_2$)$_3$CH$_3$ | H | H | H | H | CH$_3$ | greenish blue |

EXAMPLES 133–162

Examples 133–163 are physical mixtures of dyes of Formula (1) which generally show better build-up on polyester than the individual dyes.

| | Mixture Composition | | | |
|---|---|---|---|---|
| Example | Dye of Example | % | Dye of Example | % |
| 133 | 2 | 90 | 24 | 10 |
| 134 | 2 | 75 | 24 | 25 |
| 135 | 2 | 50 | 24 | 50 |
| 136 | 2 | 90 | 46 | 10 |
| 137 | 2 | 75 | 46 | 25 |
| 138 | 2 | 50 | 46 | 50 |
| 139 | 2 | 90 | 45 | 10 |
| 140 | 2 | 75 | 45 | 25 |
| 141 | 2 | 50 | 45 | 50 |
| 142 | 2 | 50 | 3 | 50 |
| 143 | 2 | 99.6 | Dye A | 0.4 |
| 144 | 2 | 97.1 | Dye A | 2.9 |

-continued

| Example | Dye of Example | % | Dye of Example | % |
|---|---|---|---|---|
| 145 | 2 | 94.6 | Dye A | 5.4 |
| 146 | 2 | 89.6 | Dye A | 10.4 |
| 147 | 2 | 84.6 | Dye A | 15.4 |
| 148 | 14 | 25 | 1 | 75 |
| 149 | 14 | 50 | 1 | 50 |
| 150 | 14 | 75 | 1 | 25 |
| 151 | 14 | 25 | Dye B | 75 |
| 152 | 14 | 50 | Dye B | 50 |
| 153 | 14 | 75 | Dye B | 25 |
| 154 | 3 | 99 | Dye C | 1 |
| 155 | 3 | 95 | Dye C | 5 |
| 156 | 3 | 90 | Dye C | 10 |
| 157 | 3 | 75 | Dye C | 25 |
| 158 | 3 | 50 | Dye C | 50 |
| 159 | Dye A | 99 | Dye D | 1 |
| 160 | Dye A | 95 | Dye D | 5 |
| 161 | Dye A | 90 | Dye D | 10 |
| 162 | Dye A | 75 | Dye D | 25 |
| 163 | Dye A | 50 | Dye D | 50 |

Mixture Composition

Dyes A–D

Dyes A–E are known dyes of Formula (11) in which $R^4$ is —CN, $R^{13}$ is —H.

| Dye | $R^{14}$ | $R^{12}$ |
|---|---|---|
| A | n-$C_4H_9$ | n-$C_4H_9$ |
| B | n-$C_5H_{11}$ | n-$C_5H_{11}$ |
| C | n-$C_3H_7$ | n-$C_3H_7$ |
| D | n-$C_4H_9$ | —$(CH_2)_3$phenyl |
| E | n-$C_6H_{13}$ | n-$C_6H_{13}$ |

Comparative Testing

The build up of certain pyrroline dyes on polyester textile material and the maximum Integ for 1% colour of the dye was assessed after exhaust dyeing at 130° C. C.I. Disperse Blue 60 was used as a control.

The Integ value is a single number estimate of the depth of shade of a dye on a fabric. The higher the Integ value the deeper shade. Measurement and calculation of Integ values is described in Journal of Society of Dyers and Colourists, Volume 96, April 1980, pages 166–176.

The results are summarised in Table 1 below:

TABLE 1

| Dye | Build up vs Control | Maximum Integ for 1% Colour |
|---|---|---|
| C.I. Disperse Blue 60 | — | 28 |
| A | Much inferior | 18 |
| D | Inferior | 22 |
| E | Very much inferior | 10 |
| 1 | Superior | 31.5 |
| 2 | Little superior | 31 |
| 3 | Little superior | 34 |
| 7 | Little superior | 32 |
| 25 | Inferior | 27 |
| 37 | Superior | 37.5 |
| 75% of 14 } 25% of 1 } | Trace inferior | 26.5 |
| 78 | Inferior | 23 |
| 79 | Trace inferior | 27.5 |
| 83 | Equal | 28.5 |
| 84 | Little superior | 34 |

We claim:

1. A dye of Formula (1):

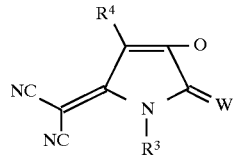

Formula (1)

wherein:

D is a group of Formula (2):

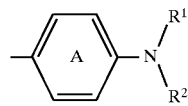

Formula (2)

or a group of Formula (3):

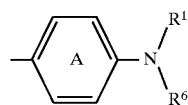

Formula (3)

or a group of Formula (4):

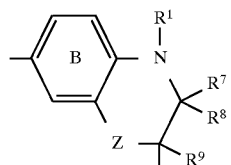

Formula (4)

or a group of Formula (4C):

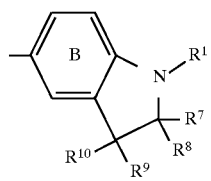

Formula (4C)

$R^1$ is alkyl, cycloalkyl, aryl, alkenyl or aralkyl each of which may be optionally substituted;

$R^2$ is optionally substituted $C_{7-20}$-alkyl; or $R^1$ and $R^2$ together with the nitrogen atom to which they are attached form a pyrrolidino or piperidino ring;

$R^3$ is alkyl, alkenyl or aralkyl each of which may be optionally substituted, —$SO_2$alkyl, —$SO_2$aryl or —COR in which R is —H or alkyl, phenyl, cycloalkyl or aralkyl each of which may be optionally substituted or —H; and $R^4$ is an electron withdrawing group;

$R^6$ is optionally substituted $C_{1-6}$-alkyl; or $R^1$ and $R^6$ together with the nitrogen atom to which they are attached form a pyrrolidino or piperidino ring;

$R^7$, $R^8$, $R^9$ and $R^{10}$ each independently is alkyl, cycloalkyl, aryl, alkenyl or aralkyl each of which may be optionally substituted or —H;

W is oxygen or sulphur;

Z is N—$R^{11}$ in which $R^{11}$ is —H or optionally substituted alkyl or aryl;

Ring A is unsubstituted apart from the —$NR^1R^2$ group or is substituted by from 1 to 4 further groups;

Ring B is unsubstituted or substituted by from 1 to 3 groups;

provided that when $R^1$ and $R^2$ are both n-octyl, Ring A is unsubstituted, and also provided that:

(a) when D is a group of Formula (2) and $R^1$ and $R^2$ are both allyl that $R^4$ is not —CN; and (b) when D is a group of Formula (3) that $R^1$ and $R^6$ are different, $R^1$ represents unsubstituted alkyl, cycloalkyl or alkenyl, and $R^6$ represents unsubstituted alkyl; or (c) at least one of $R^1$ and $R^6$ is branched chain alkyl.

2. A dye according to claim 1 in which

D is a group of Formula (3);

$R^3$ is —H, $C_{1-4}$-alkyl, $C_{2-3}$-alkenyl or phenyl$C_{1-3}$-alkyl;

$R^4$ is —CN, —SO$_2$F, —COOR$^5$, —CON(R$^5$)$_2$, —SO$_2$R$^5$ in which $R^5$ is —H, $C_{1-8}$-alkyl, $C_{4-8}$-cycloalkyl, phenyl, $C_{2-3}$-alkenyl or phenyl$C_{1-3}$-alkyl;

$R^6$ is $C_{1-6}$-alkyl;

W is oxygen;

Ring A is unsubstituted or is substituted in the 2-position.

3. A dye according to claim 2 in which $R^3$ is —H, $R^4$ is —CN and W is oxygen.

4. A synthetic textile material selected from the group consisting of polyester, polyamide, polyurethane elastomers, cellulose acetate and triacetate and blends containing polyester-cotton, polyester-wool and polyester-viscose when dyed with any of the dyes of claim 1 or mixtures thereof.

5. A mixture of two or more dyes of Formula (1):

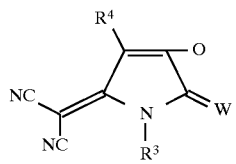

Formula (1)

wherein

D is a group of Formula (2):

Formula (2)

or a group of Formula (3):

Formula (3)

or a group of Formula (4):

Formula (4)

or a group of Formula (4C):

Formula (4C)

$R^1$ is alkyl, cycloalkyl, aryl, alkenyl or aralkyl each of which may be optionally substituted;

$R^2$ is optionally substituted $C_{7-20}$-alkyl; or $R^1$ and $R^2$ together with the nitrogen atom to which they are attached form a pyrrolidino or piperidino ring;

$R^3$ is alkyl, alkenyl or aralkyl each of which may be optionally substituted or —COR in which R is —H or alkyl, phenyl, cycloalkyl or aralkyl each of which may be optionally substituted or —H;

$R^4$ is an electron withdrawing group; and $R^6$ is unsubstituted $C_{1-6}$-alkyl; or $R^1$ and $R^6$ together with the nitrogen atom to which they are attached form a pyrrolidino or piperidino ring;

provided that when D is a group of Formula (3), $R^1$ represents unsubstituted alkyl, cycloalkyl, aryl, alkenyl or aralkyl $R^7$, $R^8$, $R^9$ and $R^{10}$ each independently is alkyl, cycloalkyl, aryl, alkenyl or aralkyl each of which may be optionally substituted or —H;

W is oxygen or sulphur;

Z is N—$R^{11}$ in which $R^{11}$ is —H or optionally substituted alkyl;

Ring A is unsubstituted apart from the —NR$^1$R$^2$ group or is substituted by from 1 to 4 further groups; and Ring B is unsubstituted or substituted by from 1 to 3 groups.

6. A mixture of one or more dyes of Formula (1):

Formula (1)

and one or more different dyes of Formula (11):

Formula (11)

wherein:

D is a group of Formula (2):

Formula (2)

or a group of Formula (3):

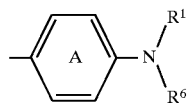
Formula (3)

or a group of Formula (4):

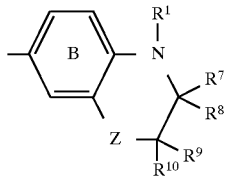
Formula (4)

or a group of Formula (4C):

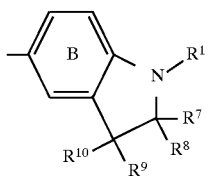
Formula (4C)

$R^1$ is alkyl, cycloalkyl, aryl, alkenyl or aralkyl each of which may be optionally substituted;

$R^2$ is optionally substituted $C_{7-20}$-alkyl; or $R^1$ and $R^2$ together with the nitrogen atom to which they are attached form a pyrrolidino or piperidino ring;

$R^3$ is alkyl, alkenyl or aralkyl each of which may be optionally substituted or —COR in which R is —H or alkyl, phenyl, cycloalkyl or aralkyl each of which may be optionally substituted or —H; and $R^4$ is an electron withdrawing group;

$R^6$ is unsubstituted $C_{1-6}$-alkyl; or $R^1$ and $R^6$ together with the nitrogen atom to which they are attached form a pyrrolidino or piperidino ring;

provided that when D is a group of Formula (3), $R^1$ represents unsubstituted alkyl, cycloalkyl, aryl, alkenyl or aralkyl $R^7$, $R^8$, $R^9$ and $R^{10}$ each independently is alkyl, cycloalkyl, aryl, alkenyl or aralkyl each of which may be optionally substituted or —H;

W is oxygen or sulphur;

Z is N—$R^{11}$ in which $R^{11}$ is —H or optionally substituted alkyl;

Ring A is unsubstituted apart from the —$NR^1R^2$ group or is substituted by from 1 to 4 further groups; and Ring B is unsubstituted or substituted by from 1 to 3 groups;

$R^{12}$ and $R^{14}$ are each independently alkyl, alkenyl, alkoxyalkyl, alkenyloxyalkyl, aryloxyalkyl, aralkyl, alkoxycarbonylalkyl or aryloxyalkoxycarbonylalkyl; and $R^{13}$ is —H, alkyl, alkenyl, aralkyl, alkoxycarbonylalkyl, aryloxyalkoxycarbonylalkyl or cyanoalkyl.

7. A mixture of two or more pyrrolidone dyes of Formula (11):

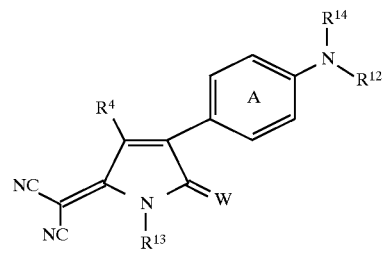
Formula (11)

Ring A is unsubstituted apart from the —$NR^1R^2$ group or is substituted by from 1 to 4 further groups;

W is oxygen or sulphur;

$R^4$ is an electron withdrawing group;

$R^{12}$ and $R^{14}$ are each independently alkyl, alkenyl, alkoxyalkyl, alkenyloxyalkyl, aryloxyalkyl, aralkyl, alkoxycarbonylalkyl or aryloxyalkoxycarbonylalkyl; and $R^{13}$ is —H, alkyl, alkenyl, aralkyl, alkoxycarbonylalkyl, aryloxyalkoxycarbonylalkyl or cyanoalkyl.

8. A mixture of dyes comprises two or more dyes of Formula (11)

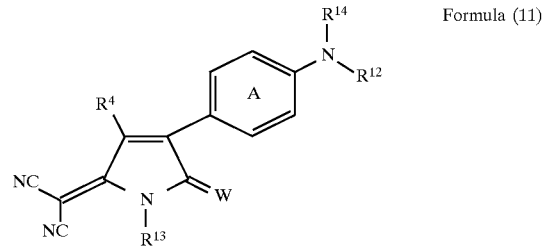
Formula (11)

in which W is oxygen, $R^4$ is —CN, $R^{13}$ is —H, $R^{12}$ is n—$C_3H_7$, n—$C_4H_9$ or n—$C_5H_{11}$ and $R^{14}$ is —$(CH_2)_3$phenyl, n—$C_3H_7$, n—$C_4H_9$ or n—$CH_5H_{11}$.

9. A process for the coloration of synthetic textile materials or fibre blends thereof which comprises applying to the synthetic textile material a dye of Formula (1) or mixtures thereof:

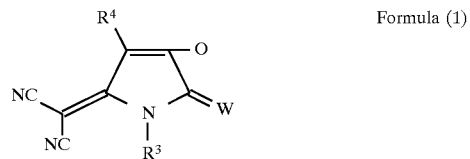
Formula (1)

wherein:

D is a group of Formula (2):

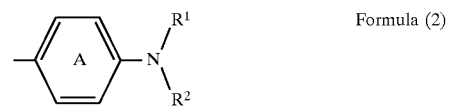
Formula (2)

or a group of Formula (3):

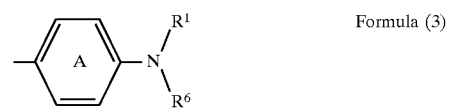
Formula (3)

or a group of Formula (4):

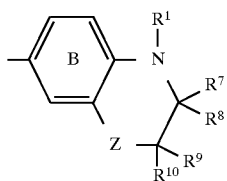

or a group of Formula (4C):

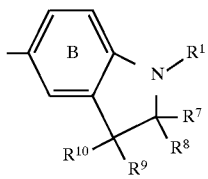

R$^1$ is alkyl, cycloalkyl, aryl, alkenyl or aralkyl each of which may be optionally substituted;

R$^2$ is optionally substituted C$_{7-20}$-alkyl; or

R$^1$ and R$^2$ together with the nitrogen atom to which they are attached form a pyrrolidino or piperidino ring;

R$^3$ is alkyl, alkenyl or aralkyl each of which may be optionally substituted or —COR in which R is —H or alkyl, phenyl, cycloalkyl or aralkyl each of which may be optionally substituted or —H; and R$^4$ is an electron withdrawing group;

R$^6$ is optionally substituted C$_{1-6}$-alkyl; or

R$^1$ and R$^6$ together with the nitrogen atom to which they are attached form a pyrrolidino or piperidino ring;

R$^7$, R$^8$, R$^9$ and R$^{10}$ each independently is alkyl, cycloalkyl, aryl, alkenyl or aralkyl each of which may be optionally substituted or —H;

W is oxygen or sulphur;

Z is N—R$^{11}$ in which R$^{11}$ is —H or optionally substituted alkyl;

Ring A is unsubstituted apart from the —NR$^1$R$^2$ group or is substituted by from 1 to 4 further groups;

Ring B is unsubstituted or substituted by from 1 to 3 groups;

provided (a) that when D is a group of Formula (2) and R$^1$ and R$^2$ are both allyl that R$^4$ is not —CN or (b) that when D is a group of Formula (3) that R$^1$ and R$^6$ are different, R$^1$ represents unsubstituted alkyl, cycloalkyl or alkenyl, and R$^6$ represents unsubstituted alkyl or (c) that at least one of R$^1$ and R$^6$ is branched chain alkyl and provided further that when R$^1$ and R$^2$ are both n-octyl, Ring A is unsubstituted.

10. A process for the coloration of synthetic textile materials of fibre blends thereof which comprises applying to the synthetic textile material a mixture which comprises applying to the synthetic textile material a mixture of dyes of Formula (1) and Formula (11):

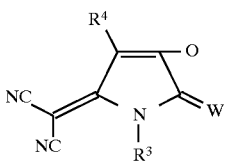

Formula (1)

-continued

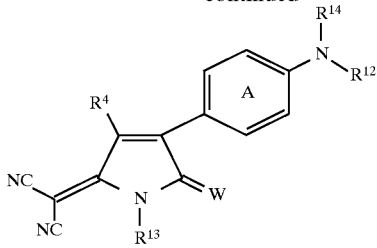

Formula (11)

wherein:

D is a group of Formula (2):

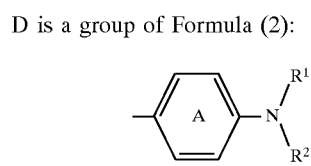

Formula (2)

or a group of Formula (3):

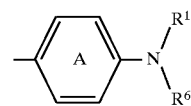

Formula (3)

or a group of Formula (4):

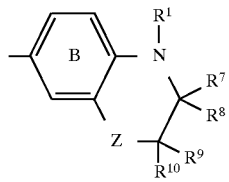

Formula (4)

or a group of Formula (4C):

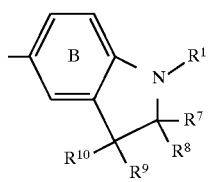

Formula (4C)

R$^1$ is alkyl, cycloalkyl, aryl, alkenyl or aralkyl each of which may be optionally substituted;

R$^2$ is optionally substituted C$_{7-20}$-alkyl; or

R$^1$ and R$^2$ together with the nitrogen atom to which they are attached form a pyrrolidino or piperidino ring;

R$^3$ is alkyl, alkenyl or aralkyl each of which may be optionally substituted or —COR in which R is —H or alkyl, phenyl, cycloalkyl or aralkyl each of which may be optionally substituted or —H;

R$^4$ is an electron withdrawing group; and

R$^6$ is unsubstituted C$_{1-6}$-alkyl; or

R¹ and R⁶ together with the nitrogen atom to which they are attached form a pyrrolidino or piperidino ring;

provided that when D is a group of Formula (3), R¹ is unsubstituted;

R⁷, R⁸, R⁹ and R¹⁰ each independently is alkyl, cycloalkyl, aryl, alkenyl or aralkyl each of which may be optionally substituted or —H;

W is oxygen or sulphur;

Z is N—R¹¹ in which R¹¹ is —H or optionally substituted alkyl;

Ring A is unsubstituted apart from the —NR¹R² group or is substituted by from 1 to 4 further groups; and Ring B is unsubstituted or substituted by from 1 to 3 groups;

R¹² and R¹⁴ are each independently alkyl, alkenyl, alkoxyalkyl, alkenyloxyalkyl, aryloxyalkyl, aralkyl, alkoxycarbonylalkyl or aryloxyalkoxycarbonylalkyl; and R¹³ is —H, alkyl, alkenyl, aralkyl, alkoxycarbonylalkyl, aryloxyalkoxycarbonylalkyl or cyanoalkyl.

11. A process for the coloration of synthetic textile materials or fibre blends thereof which comprises applying to the synthetic textilen material a mixture of dyes of Formula (11):

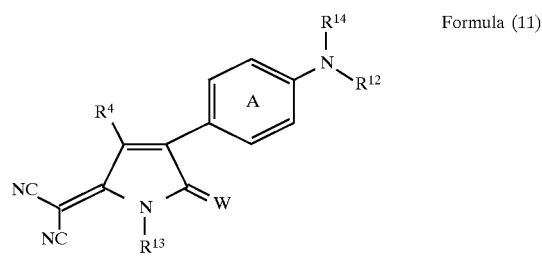

Formula (11)

Ring A is unsubstituted apart from the —NR¹R² group or is substituted by from 1 to 4 further groups;

W is oxygen or sulphur;

R⁴ is an electron withdrawing group;

R¹² and R¹⁴ are each independently alkyl, alkenyl, alkoxyalkyl, alkenyloxyalkyl, aryloxyalkyl, aralkyl, alkoxycarbonylalkyl or aryloxyalkoxycarbonylalkyl; and R¹³ is —H, alkyl, alkenyl, aralkyl, alkoxycarbonylalkyl, aryloxyalkoxycarbonylalkyl or cyanoalkyl.

12. A process according to any one of claims 10 to 11 in which the synthetic textile material is a polyester or fibre blend thereof.

* * * * *